US009219732B2

(12) United States Patent
Baghdasaryan et al.

(10) Patent No.: US 9,219,732 B2
(45) Date of Patent: Dec. 22, 2015

(54) SYSTEM AND METHOD FOR PROCESSING RANDOM CHALLENGES WITHIN AN AUTHENTICATION FRAMEWORK

(71) Applicant: NOK NOK LABS, INC., Palo Alto, CA (US)

(72) Inventors: Davit Baghdasaryan, San Francisco, CA (US); Matthew Lourie, San Jose, CA (US); Brendon J. Wilson, San Jose, CA (US); Naga Nagarajan, San Jose, CA (US)

(73) Assignee: NOK NOK LABS, INC., Palo Alto, CA (US)

( * ) Notice: Subject to any disclaimer, the term of this patent is extended or adjusted under 35 U.S.C. 154(b) by 0 days.

(21) Appl. No.: 13/730,780

(22) Filed: Dec. 28, 2012

(65) Prior Publication Data

US 2014/0189828 A1 Jul. 3, 2014

(51) Int. Cl.
*H04L 29/06* (2006.01)

(52) U.S. Cl.
CPC .................................. *H04L 63/0861* (2013.01)

(58) Field of Classification Search
CPC .................................................. H04L 63/0861
See application file for complete search history.

(56) References Cited

U.S. PATENT DOCUMENTS 5,280,527 A * 1/1994 Gullman et al. .............. 713/184
5,764,789 A * 6/1998 Pare et al. ..................... 382/115
6,088,450 A * 7/2000 Davis et al. ................... 713/182
6,178,511 B1 1/2001 Cohen et al.
6,377,691 B1 * 4/2002 Swift et al. .................... 380/277
7,194,763 B2 3/2007 Potter et al.
7,444,368 B1 10/2008 Wong et al.
7,941,669 B2 5/2011 Foley et al.
8,284,043 B2 * 10/2012 Judd et al. ..................... 340/505
8,291,468 B1 10/2012 Chickering
8,353,016 B1 1/2013 Pravetz et al.
8,359,045 B1 1/2013 Hopkins, III
8,516,552 B2 8/2013 Raleigh
8,555,340 B2 10/2013 Potter et al.
8,561,152 B2 10/2013 Novak et al.
8,607,048 B2 12/2013 Nogawa
2002/0073320 A1 6/2002 Rinkevich et al.
2002/0087894 A1 7/2002 Foley et al.

(Continued)

OTHER PUBLICATIONS

Office Action from U.S. Appl. No. 13/730,761, mailed Feb. 27, 2014, 24 pages.

(Continued)

*Primary Examiner* — William Goodchild
*Assistant Examiner* — Wasika Nipa
(74) *Attorney, Agent, or Firm* — Nicholson De Vos Webster & Elliott LLP

(57) ABSTRACT

A system, apparatus, method, and machine readable medium are described for transparently requesting a new random challenge from a server within an authentication framework. For example, one embodiment of a method comprises: transmitting a random challenge and an indication of a timeout period associated with the random challenge from a server to a client within the context of a network registration or authentication process using authentication devices communicatively coupled to the client; automatically detecting that the random challenge is no longer valid based on the timeout period; and responsively transmitting a request for a new random challenge from the client to a server, wherein transmitting is performed transparently to a user of the client.

34 Claims, 20 Drawing Sheets

Client 100
Browser 104
Secure Transaction Plugin 105
Unsecure/Secure Connection
Secure Transaction Service 101
Interface 102
Secure Connection
Secure Storage 120
Auth Device 110
Auth Device 111
Auth Device 112
Secure Enterprise or Web Destination 130
Website 131
On-Premises Secure Transaction Server(s) 132
Secure Transaction Database 121
Off-Premises Secure Transaction Server(s) 133

(56) References Cited

U.S. PATENT DOCUMENTS

| | | | |
|---|---|---|---|
| 2002/0112170 A1 | 8/2002 | Foley et al. | |
| 2002/0174348 A1* | 11/2002 | Ting | 713/186 |
| 2003/0055792 A1 | 3/2003 | Kinoshita et al. | |
| 2003/0084300 A1 | 5/2003 | Koike | |
| 2003/0115142 A1 | 6/2003 | Brickell et al. | |
| 2003/0236991 A1 | 12/2003 | Letsinger | |
| 2006/0026671 A1 | 2/2006 | Potter et al. | |
| 2006/0156385 A1 | 7/2006 | Chiviendacz et al. | |
| 2007/0077915 A1* | 4/2007 | Black et al. | 455/411 |
| 2007/0088950 A1 | 4/2007 | Wheeler et al. | |
| 2007/0100756 A1 | 5/2007 | Varma | |
| 2007/0106895 A1 | 5/2007 | Huang et al. | |
| 2007/0118883 A1 | 5/2007 | Potter et al. | |
| 2007/0198435 A1* | 8/2007 | Siegal et al. | 705/67 |
| 2007/0239980 A1 | 10/2007 | Funayama | |
| 2007/0286130 A1 | 12/2007 | Shao et al. | |
| 2008/0046984 A1 | 2/2008 | Bohmer et al. | |
| 2008/0141339 A1 | 6/2008 | Gomez et al. | |
| 2009/0049510 A1 | 2/2009 | Zhang et al. | |
| 2009/0158425 A1 | 6/2009 | Chan et al. | |
| 2009/0204964 A1 | 8/2009 | Foley et al. | |
| 2009/0327131 A1 | 12/2009 | Beenau et al. | |
| 2010/0010932 A1 | 1/2010 | Law et al. | |
| 2010/0023454 A1 | 1/2010 | Exton et al. | |
| 2010/0062744 A1 | 3/2010 | Ibrahim | |
| 2010/0083000 A1* | 4/2010 | Kesanupalli | 713/186 |
| 2010/0107222 A1 | 4/2010 | Glasser | |
| 2010/0325684 A1 | 12/2010 | Grebenik et al. | |
| 2011/0071841 A1 | 3/2011 | Fomenko et al. | |
| 2011/0082801 A1* | 4/2011 | Baghdasaryan et al. | 705/75 |
| 2011/0167472 A1 | 7/2011 | Evans et al. | |
| 2011/0225431 A1 | 9/2011 | Stufflebeam, Jr. et al. | |
| 2011/0228330 A1 | 9/2011 | Nogawa | |
| 2012/0124639 A1 | 5/2012 | Shaikh et al. | |
| 2012/0210135 A1 | 8/2012 | Panchapakesan et al. | |
| 2012/0249298 A1* | 10/2012 | Sovio et al. | 340/5.83 |
| 2012/0278873 A1 | 11/2012 | Calero et al. | |
| 2012/0291114 A1 | 11/2012 | Poliashenko et al. | |
| 2013/0104187 A1 | 4/2013 | Weidner | |
| 2013/0160083 A1* | 6/2013 | Schrix et al. | 726/3 |
| 2013/0167196 A1 | 6/2013 | Spencer et al. | |
| 2013/0219456 A1 | 8/2013 | Sharma et al. | |
| 2013/0227646 A1 | 8/2013 | Haggerty et al. | |
| 2014/0033271 A1 | 1/2014 | Barton et al. | |
| 2014/0047510 A1 | 2/2014 | Belton et al. | |

OTHER PUBLICATIONS

Office Action from U.S. Appl. No. 13/730,795, mailed Jun. 11, 2014, 14 pages.

Office Action from U.S. Appl. No. 13/730,791 mailed Jun. 27, 2014, 17 pages.

Doherty, et al., Internet Engineering Task Force (IETF), “Dynamic Symmetric Key Provisioning Protocol (DSKPP)”, Dec. 2010, 105 pages.

Final Office Action from U.S. Appl. No. 13/730,761, Mailed Jul. 8, 2014, 37 pages.

Office Action from U.S. Appl. No. 13/730,776, mailed Jul. 15, 2014, 16 pages.

Office Action from U.S. Appl. No. 13/730,761, mailed Sep. 9, 2014, 36 pages.

International Search Report and the Written Opinion of the International Searching Authority for International Application No. PCT/US2013/077888, mailed Aug. 4, 2014, 10 pages.

Notice of Allowance from U.S. Appl. No. 13/730,795, mailed May 15, 2015, 8 pages.

Office Action from U.S. Appl. No. 13/730,795, mailed Jan. 5, 2015, 18 pages.

Final Office Action from U.S. Appl. No. 13/730,795, mailed Aug. 14, 2014, 20 pages.

Notice of Allowance from U.S. Appl. No. 13/730,791, mailed Mar. 10, 2015, 17 pages.

Final Office Action from U.S. Appl. No. 13/730,791, mailed Nov. 13, 2014, 22 pages.

Final Office Action from U.S. Appl. No. 13/730,776, mailed Nov. 3, 2014, 20 pages.

Notice of Allowance from U.S. Appl. No. 13/730,776, mailed Feb. 13, 2015, 17 pages.

Final Office Action from U.S. Appl. No. 13/730,761, mailed Jan. 15, 2015, 30 pages.

* cited by examiner

SYSTEM AND METHOD FOR PROCESSING RANDOM CHALLENGES WITHIN AN AUTHENTICATION FRAMEWORK

BACKGROUND

1. Field of the Invention

This invention relates generally to the field of data processing systems. More particularly, the invention relates to an improved system and method for processing random challenges within an authentication framework.

2. Description of Related Art

Existing systems have been designed for providing secure user authentication over a network using biometric sensors. In particular, an Online Secure Transaction Plugin (OSTP) protocol developed by the Fast Identify Online (FIDO) alliance enables strong authentication (e.g., protection against identity theft and phishing), secure transactions (e.g., protection against "malware in the browser" and "man in the middle" attacks for transactions), and enrollment/management of client authentication tokens (e.g., fingerprint readers, facial recognition devices, smartcards, trusted platform modules, etc). Details of the existing OSTP protocol can be found, for example, in U.S. Patent Application No. 2011/0082801 ("'801 Application"), and the document entitled OSTP Framework (Mar. 23, 2011), both of which describe a framework for user registration and authentication on a network.

BRIEF DESCRIPTION OF THE DRAWINGS

A better understanding of the present invention can be obtained from the following detailed description in conjunction with the following drawings, in which.

DETAILED DESCRIPTION OF PREFERRED EMBODIMENTS

Figure 1A:
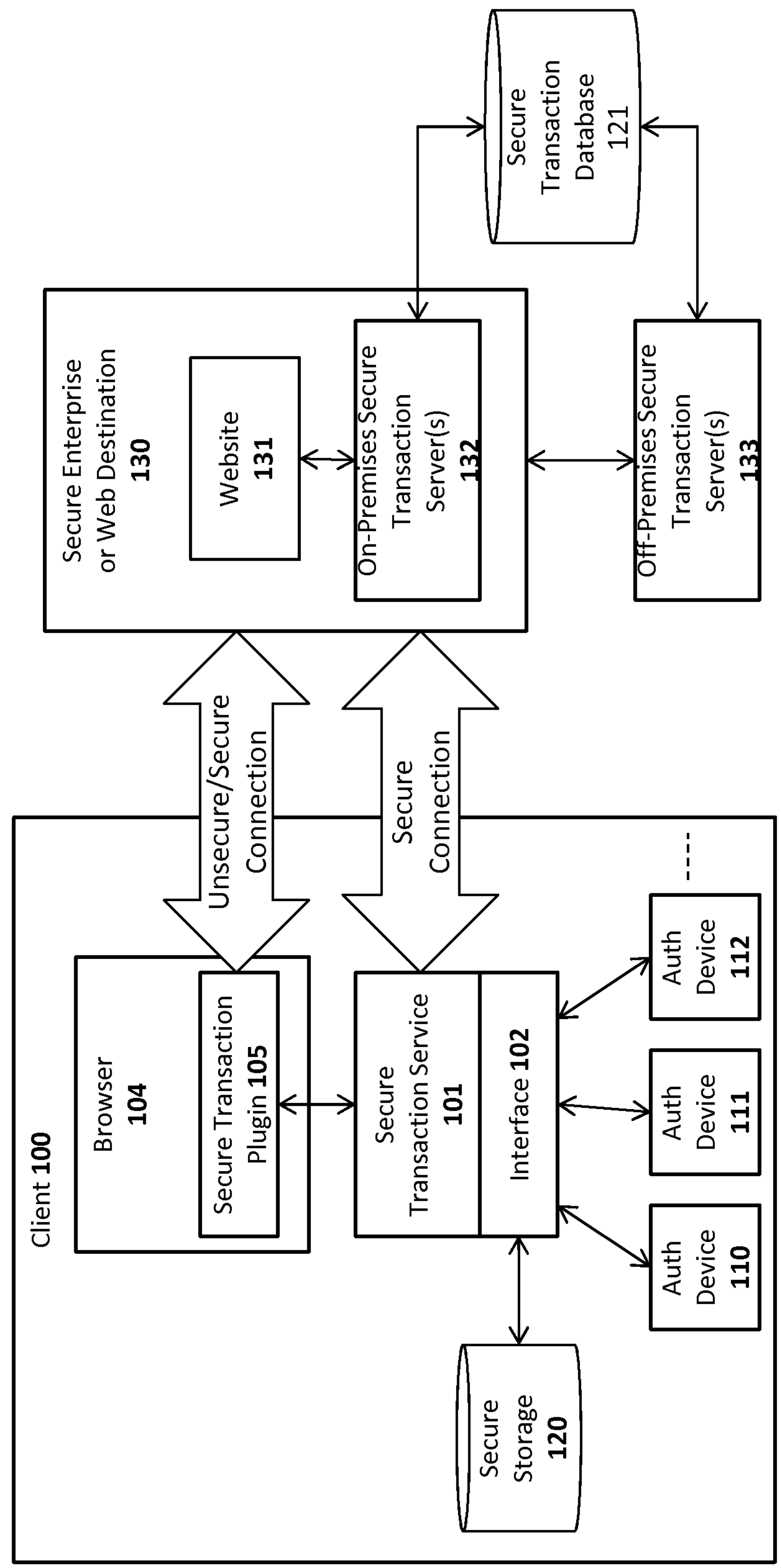
FIGS. 1A-B illustrate two different embodiments of a secure authentication system architecture.

Described below are embodiments of an apparatus, method, and machine-readable medium for intelligently implementing an authentication framework in a client-server environment. Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are not shown or are shown in a block diagram form to avoid obscuring the underlying principles of the present invention.

The embodiments of the invention discussed below involve client devices with authentication capabilities such as biometric devices. These devices are sometimes referred to herein as "tokens." Various different biometric devices may be used including, but not limited to, fingerprint sensors, voice recognition hardware/software (e.g., a microphone and associated software for recognizing a user's voice), facial recognition hardware/software (e.g., a camera and associated software for recognizing a user's face), and optical recognition capabilities (e.g., an optical scanner and associated software for scanning the retina of a user). The authentication capabilities may also include non-biometric devices such as a trusted platform modules (TPMs) and smartcards.

The embodiments of the invention described below provide various improvements over existing authentication techniques. For example, in contrast to current techniques which require a client to communicate an exhaustive list of all of its authentication capabilities (e.g., all of its authentication tokens/devices) over a network, one embodiment of the invention implements a query policy in which a secure transaction server initially transmits a server policy to the client indicating the authentication capabilities accepted by the server. The client then analyzes the server policy to identify a subset of authentication capabilities, thereby reducing the privacy impact to the client.

In another embodiment, multiple configurable levels of privacy protection are employed. Privacy classes are predefined and may be selected and/or modified by the end user. In one embodiment of the invention, the privacy classes are defined based on the probability with which a client can be identified using the information requested. At relatively higher privacy levels (having a relatively lower privacy impact), relatively less information about the client device is divulged to perform the authentication techniques described herein.

Another embodiment of the invention provides for the provisioning or authentication of multiple devices at the same time, thereby improving efficiency. For example, instead of requesting registration or authentication for a single authentication device at a time, a list of authentication devices may be sent from the server. Symmetric and/or asymmetric keys are then provisioned into multiple tokens/devices in one operation, or series of sequential operations executed locally on the client. For authentication, several tokens/devices may be selected concurrently for a given transaction.

Another embodiment of the invention improves the efficiency with which server challenges are processed and managed. Today, after a server sends a random challenge to the client (e.g., a cryptographic nonce), if the client does not respond within a specified timeout period, the nonce is no longer valid and the client will receive an error in response to a subsequent authentication attempt. For example, if the user suspends the client to move to a new location (e.g., closing the lid on a laptop) and then attempts authentication, the authentication attempt will be denied. In one embodiment of the invention, the client detects that the random challenge has expired and automatically and transparently requests a new challenge from the server. The server then generates a new challenge and transmits it to the client where it may be used for authentication. The end user experience is improved because the user does not receive an error or denial of an authentication request.

Another embodiment of the invention employs transaction signing on a secure transaction server so that no transaction state needs to be maintained on the server to maintain current sessions with clients. Transaction content such as transaction text is sent to the client signed by server, when the server responds it sends back the transaction content with the signature. The server does not need to store transaction state because it can verify that the signed transaction responses received by the client are valid by verifying the signature.

While described above as separate embodiments, all of the above techniques may be combined together in various ways within a single comprehensive authentication system. Thus, a given embodiment of the invention may be combined with one or more other embodiments described herein for improving client and user authentication in a secure network environment.

Exemplary System Architectures

Figure 1B:
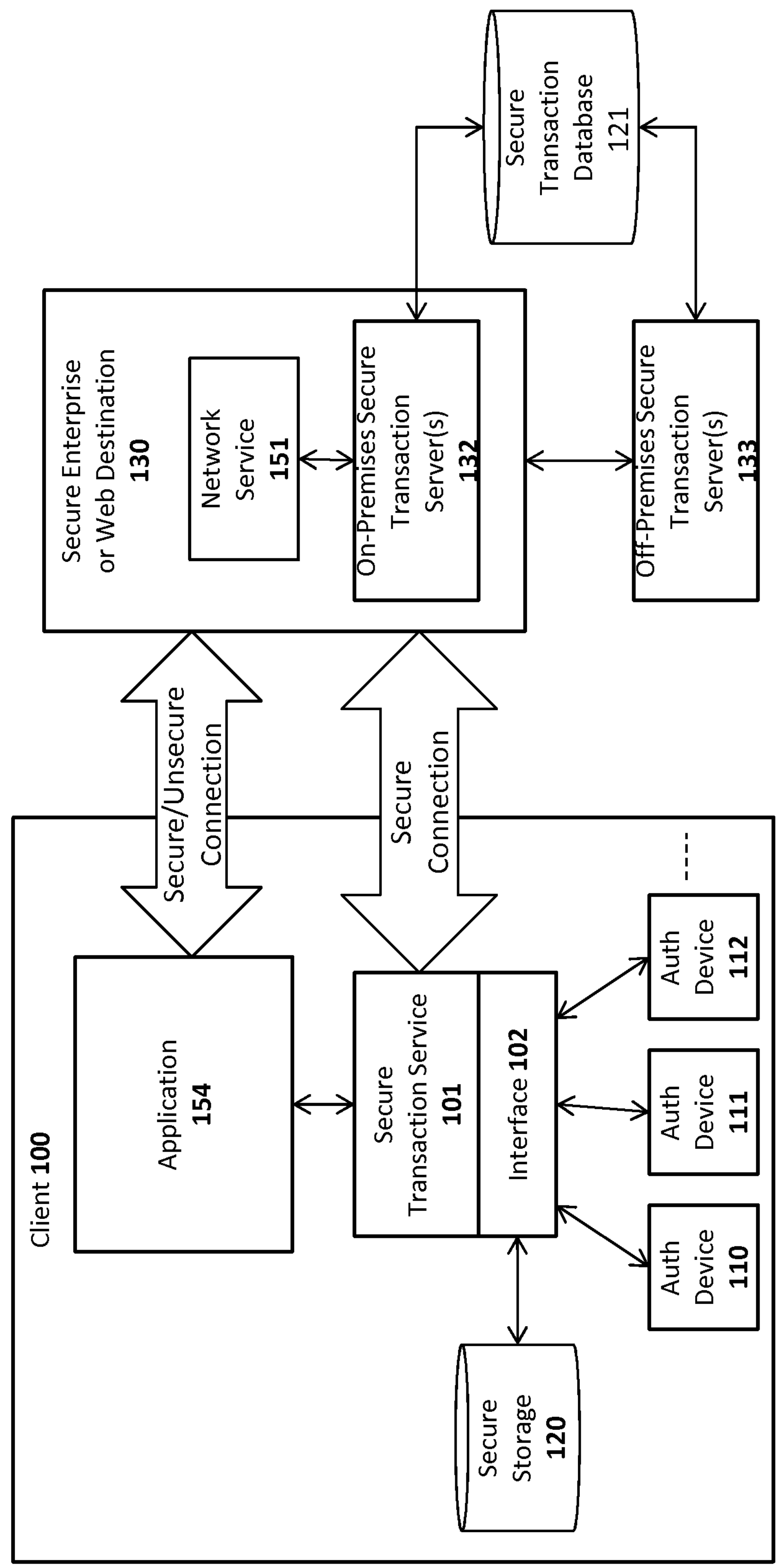

FIGS. 1A-B illustrate two embodiments of a system architecture comprising client-side and server-side components for authenticating a user. The embodiment shown in FIG. 1A uses a browser plugin-based architecture for communicating with a website while the embodiment shown in FIG. 1B does not require a browser. The various techniques described herein such as enrolling a user with authentication devices, registering the authentication devices with a secure server, and authenticating a user may be implemented on either of these system architectures. Thus, while the architecture shown in FIG. 1A is used to demonstrate the operation of several of the embodiments described below, the same basic principles may be easily implemented on the system shown in FIG. 1B (e.g., by removing the browser plugin 105 as the intermediary for communication between the server 130 and the secure transaction service 101 on the client).

Turning first to FIG. 1A, the illustrated embodiment includes a client 100 equipped with one or more authentication devices 110-112 (sometimes referred to in the art as authentication "tokens") for enrolling and authenticating an end user. As mentioned above, the authentication devices 110-112 may include biometric device such as fingerprint sensors, voice recognition hardware/software (e.g., a microphone and associated software for recognizing a user's voice), facial recognition hardware/software (e.g., a camera and associated software for recognizing a user's face), and optical recognition capabilities (e.g., an optical scanner and associated software for scanning the retina of a user) and non-biometric devices such as a trusted platform modules (TPMs) and smartcards.

The authentication devices 110-112 are communicatively coupled to the client through an interface 102 (e.g., an application programming interface or API) exposed by a secure transaction service 101. The secure transaction service 101 is a secure application for communicating with one or more secure transaction servers 132-133 over a network and for interfacing with a secure transaction plugin 105 executed within the context of a web browser 104. As illustrated, the Interface 102 may also provide secure access to a secure storage device 120 on the client 100 which stores information related to each of the authentication devices 110-112 such as a device identification code, user identification code, user enrollment data (e.g., scanned fingerprint or other biometric data), and keys used to perform the secure authentication techniques described herein. For example, as discussed in detail below, a unique key may be stored into each of the authentication devices and used when communicating to servers 130 over a network such as the Internet.

As discussed below, certain types of network transactions are supported by the secure transaction plugin 105 such as HTTP or HTTPS transactions with websites 131 or other servers. In one embodiment, the secure transaction plugin is initiated in response to specific HTML tags inserted into the HTML code of a web page by the web server 131 within the secure enterprise or Web destination 130 (sometimes simply referred to below as "server 130"). In response to detecting such a tag, the secure transaction plugin 105 may forward transactions to the secure transaction service 101 for processing. In addition, for certain types of transactions (e.g., such as secure key exchange) the secure transaction service 101 may open a direct communication channel with the on-premises transaction server 132 (i.e., co-located with the website) or with an off-premises transaction server 133.

The secure transaction servers 132-133 are coupled to a secure transaction database 121 for storing user data, authentication device data, keys and other secure information needed to support the secure authentication transactions described below. It should be noted, however, that the underlying principles of the invention do not require the separation of logical components within the secure enterprise or web destination 130 shown in FIG. 1A. For example, the website 131 and the secure transaction servers 132-133 may be implemented within a single physical server or separate physical servers. Moreover, the website 131 and transaction servers 132-133 may be implemented within an integrated software module executed on one or more servers for performing the functions described below.

As mentioned above, the underlying principles of the invention are not limited to a browser-based architecture shown in FIG. 1A. FIG. 1B illustrates an alternate implementation in which a stand-alone application 154 utilizes the functionality provided by the secure transaction service 101 to authenticate a user over a network. In one embodiment, the application 154 is designed to establish communication sessions with one or more network services 151 which rely on the secure transaction servers 132-133 for performing the user/client authentication techniques described in detail below.

In either of the embodiments shown in FIGS. 1A-B, the secure transaction servers 132-133 may generate the keys which are then securely transmitted to the secure transaction service 101 and stored into the authentication devices within the secure storage 120. Additionally, the secure transaction servers 132-133 manage the secure transaction database 121 on the server side.

An Overview of Device Discovery, Enrollment, Registration, and Authentication An exemplary series of transactions for performing authentication device discovery, enrollment, registration, and authentication are shown in FIGS. 2-6. Some aspects of these transactions have been employed in the OSTP protocol mentioned above (see the OSTP Framework (Mar. 23, 2011) for additional details, which is incorporated herein by reference). An understanding of the basic operation of these transactions will provide a context in which embodiments of the invention may be implemented.

Figure 5:
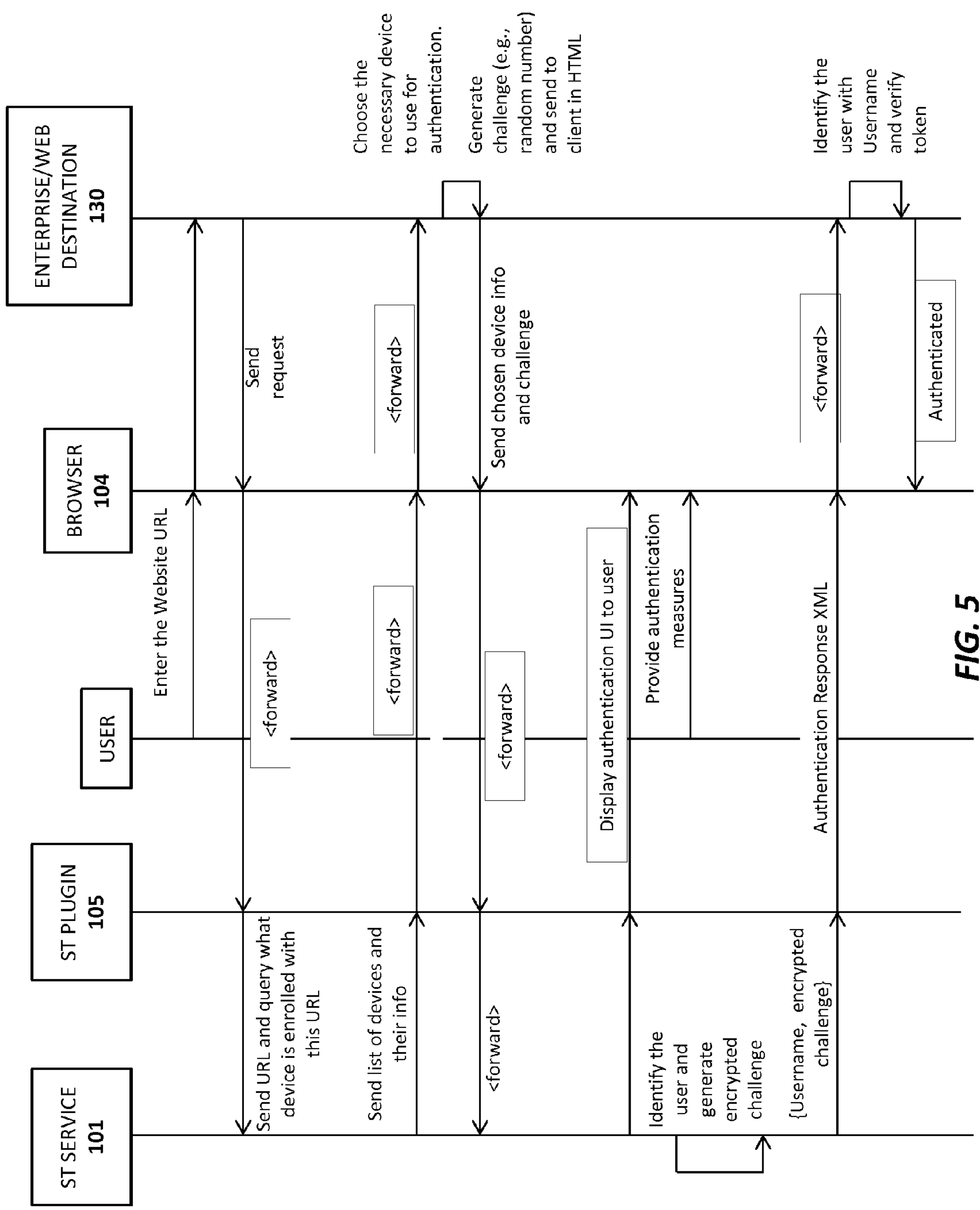
FIG. 5 is a transaction diagram showing how user authentication may be implemented within an authentication framework.
Figure 6:
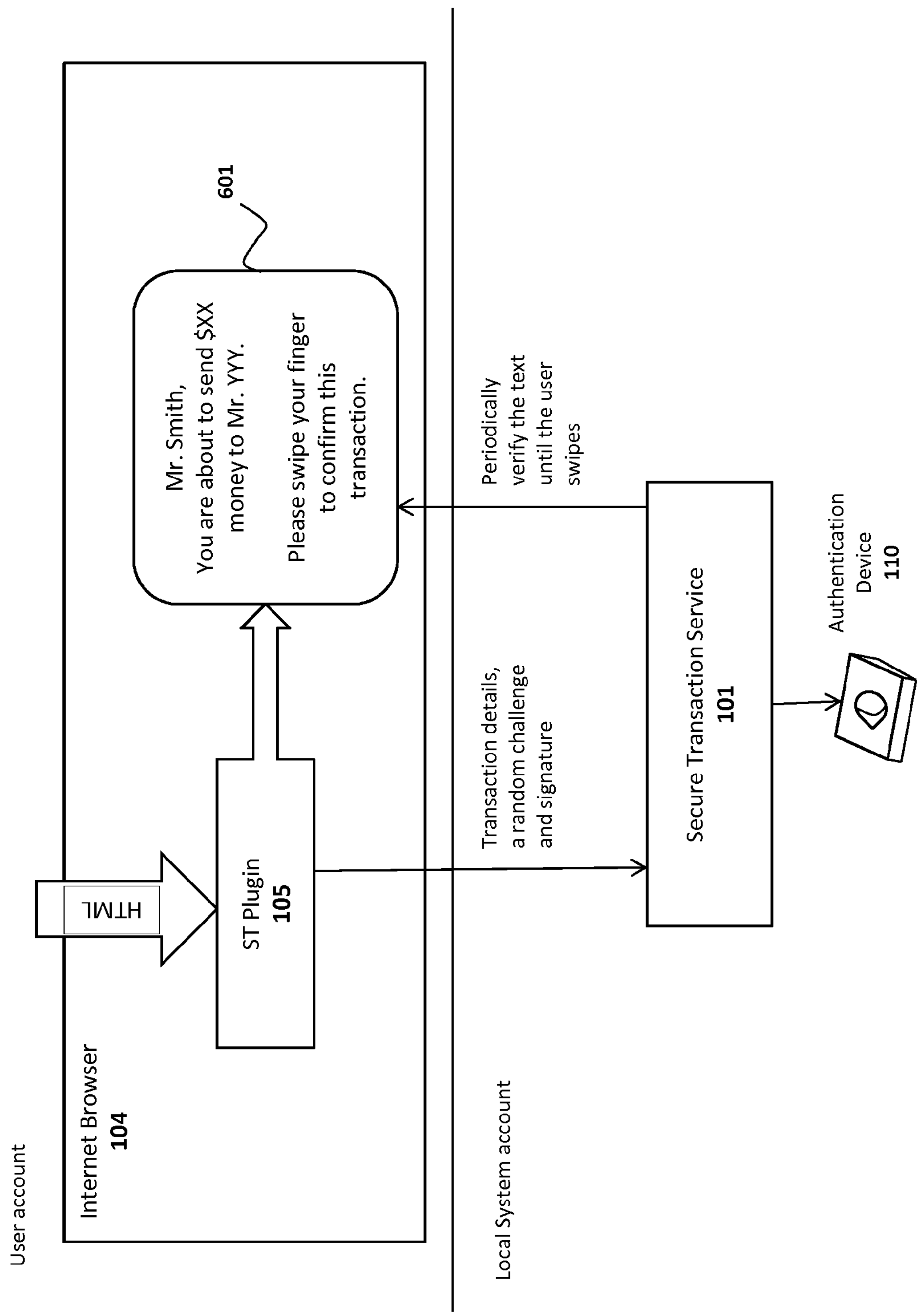
FIG. 6 is a transaction diagram showing how details of a transaction may be verified.

The operations described below include detection of authentication devices (FIG. 2); enrollment of the user with the authentication devices (FIG. 3); registration of authentication devices (FIG. 4); user authentication with the registered authentication devices (FIG. 5); and implementation of secure transactions following authentication (FIG. 6).

Figure 2:
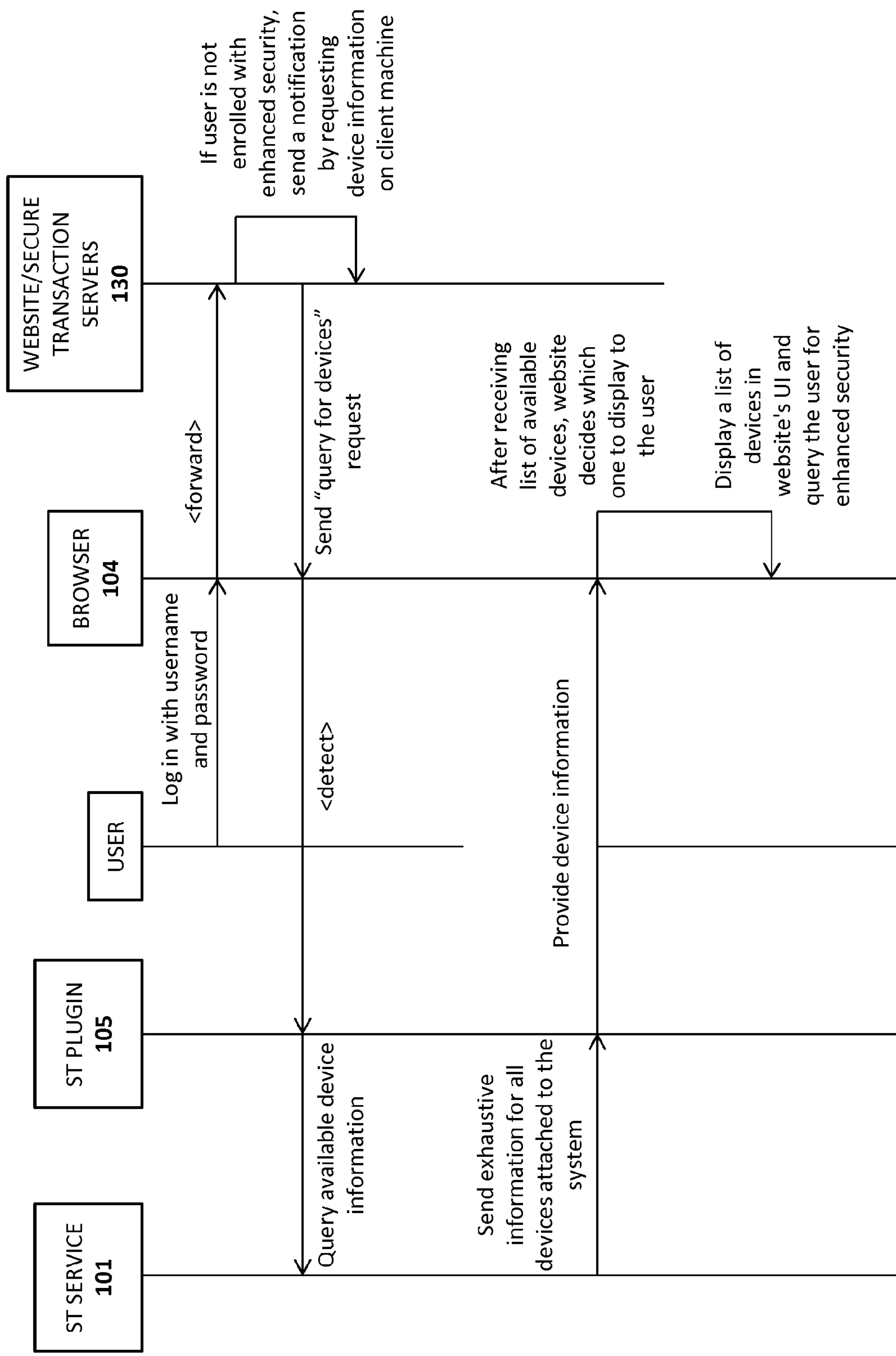
FIG. 2 is a transaction diagram showing how authentication devices on a client device may be discovered.

FIG. 2 illustrates a series of transactions for detecting authentication devices on the client machine. After device detection is successfully completed, the server 130 possesses exhaustive information about the authentication devices attached to the client and will be able to assess which device (s) are most appropriate to use with the enhanced security infrastructure. Only the server 130 filters the list of authentication devices. The user will be provided with this list and may choose one (or combination) of authentication devices to use for further authentication and implementation of secure transactions.

In operation, the user authenticates with username and password in browser and logs in to web site. This is the only time that the user will be required to provide a user name and password. The server 130 determines that the user is not currently using enhanced security (e.g., by querying the secure transaction database 121) and provides a suggestion to the user to change to enhanced security.

In one embodiment, the server 130 includes a "query for devices" tag in an HTML page which the secure transaction plugin 105 detects. In response to detecting the tag, the secure transaction plugin 105 reroutes the request to the secure transaction service 101 which then prepares exhaustive information about all authentication devices attached to the system including security characteristics of the devices. In one embodiment, the information is packaged in an XML format prior to transmission using a pre-specified data schema.

The secure transaction plugin 105 receives this information from the secure transaction service 101 and, in one embodiment, passes the information to the web page's JavaScript via a registered callback. It then chooses how to display the information in the browser 104. The list, filtered by the website, may be shown to the user and the user may select one or a combination of authentication devices.

Figure 3:
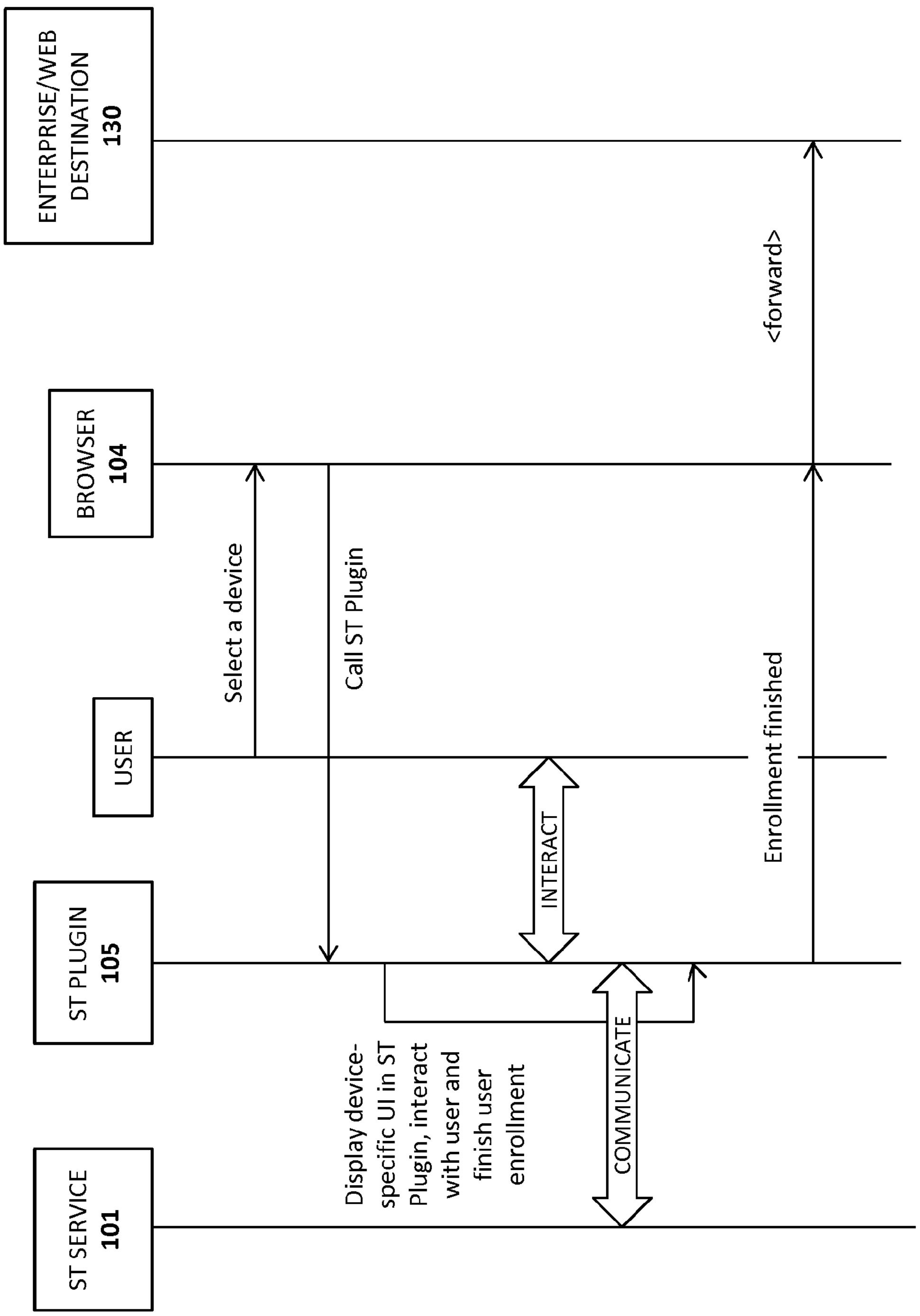
FIG. 3 is a transaction diagram showing how a user may enroll with authentication devices.

FIG. 3 illustrates a series of transactions to enroll the user with the authentication devices. In one embodiment, enrollment is a prerequisite for using the enhanced security provided by the embodiments of the invention described herein. Enrollment involves taking a biometric reading of the user (e.g., a fingerprint, voice sample, etc) so that the same authentication device can be used to authenticate the user during a subsequent transaction. The enrollment operation may be done solely on the client, without interaction with the server 130. The user interface(s) provided for enrollment may be displayed in the browser extension or may be displayed in a separate application or mobile device app.

The enrollment operation may be initiated as soon as devices are detected. The user may choose to use one or a group of discovered devices for enhanced security. In operation, the user may select a device from the displayed device list in the browser, application or mobile device app. For the browser-based implementation illustrated in FIG. 3, the secure transaction plugin 105 displays a device-specific enrollment graphical user interface (GUI). The secure transaction plugin 105 transmits the device identifier and an enrollment request to secure transaction service 101 and waits for completion. If the user is already enrolled with an authentication device on the client, the user may only need to verify their identity (i.e., they will not be required to enroll again). If the user is not currently enrolled, then the secure transaction service 101 starts the enrollment process by activating the physical authentication device (e.g., via the device interface 102). The user then interacts with the secure transaction plugin 105 GUI and follows the specified enrollment steps (e.g., swiping a finger, speaking into a microphone, snapping a picture, etc). Once complete, the user will be enrolled with the authentication device. Significantly, once a user is enrolled with a device, they may use this enrollment to register or authenticate with any website or network service as described herein.

Figure 4:
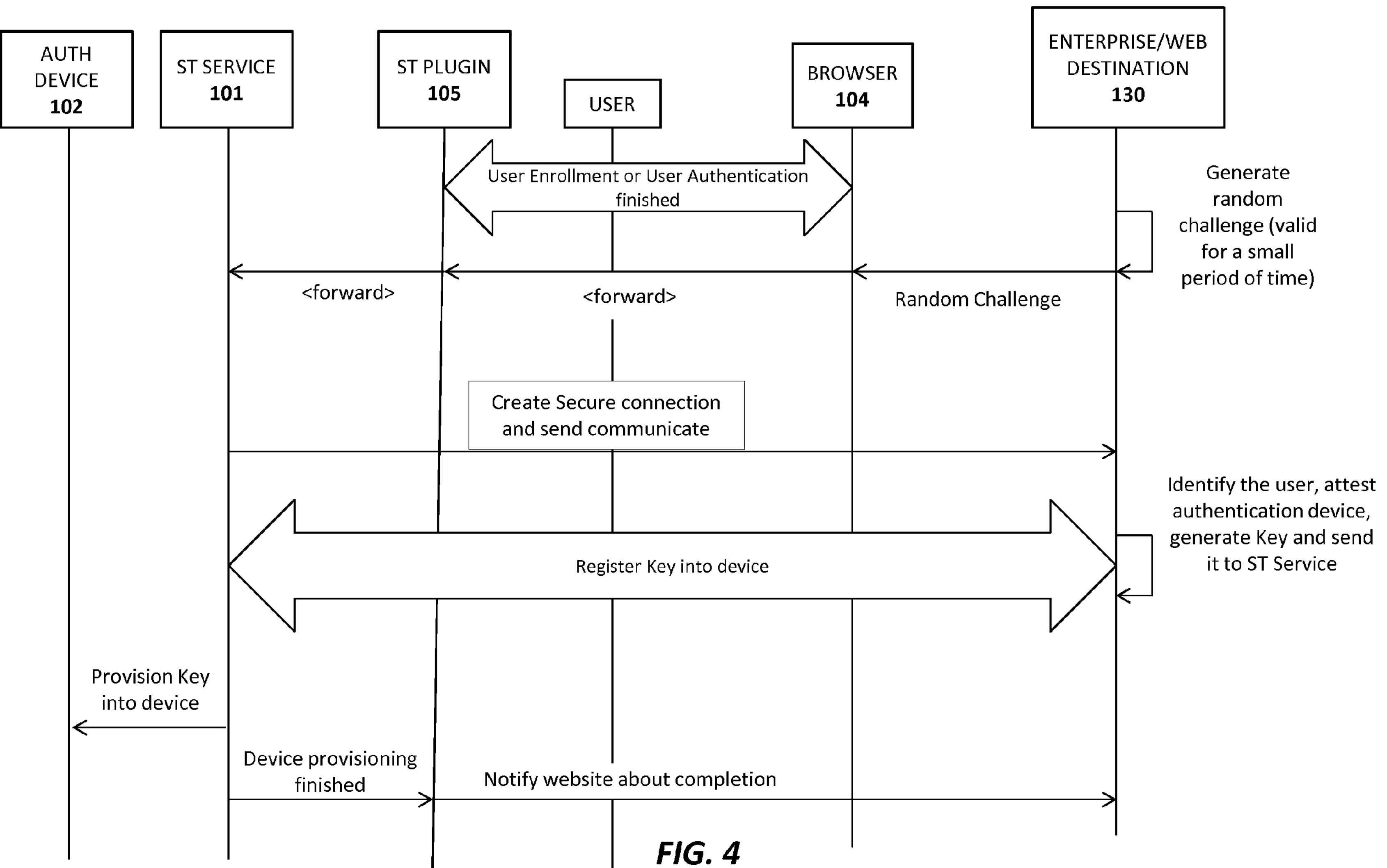
FIG. 4 is a transaction diagram showing how keys may be registered into authentication devices.

FIG. 4 illustrates a series of transactions for registration of authentication devices. During registration, a key is shared between the authentication device and one of the secure transaction servers 132-133. The key is stored within the secure storage 120 of the client 100 and the secure transaction database 121 used by the secure transaction servers 132-133. In one embodiment, the key is a symmetric key generated by one of the secure transaction servers 132-133. However, in another embodiment discussed below, asymmetric keys may be used. In this embodiment, the public key may be stored by the secure transaction servers 132-133 and a second, related private key may be stored in the secure storage 120 on the client. Moreover, in one embodiment (also discussed below), the key(s) may be generated on the client 100 (e.g., by the authentication device or the authentication device interface rather than the secure transaction servers 132-133).

A secure key provisioning protocol such as the Dynamic Symmetric Key Provisioning Protocol (DSKPP) may be used to share the key with the client over a secure communication channel (see, e.g., Request for Comments (RFC) 6063). However, the underlying principles of the invention are not limited to any particular key provisioning protocol.

Turning to the specific details shown in FIG. 4, once the user enrollment or user authentication is complete, the server 130 generates a randomly generated challenge (e.g., a cryptographic nonce) that must be presented by the client during device registration. The random challenge may be valid for a limited period of time. The secure transaction plugin detects the random challenge and forwards it to the secure transaction service 101. In response, the secure transaction service initiates an out-of-band session with the server 130 (e.g., an out-of-band transaction) and communicates with the server 130 using the key provisioning protocol. The server 130 locates the user with the user name, validates the random challenge, validates the device's authentication code if one was sent, and creates a new entry in the secure transaction database 121 for the user. It may also generate the key, write the key to the database 121 and send the key back to the secure transaction service 101 using the key provisioning protocol. Once complete, the authentication device and the server 130 share the same key if a symmetric key was used or different keys if asymmetric keys were used.

FIG. 5 illustrates a series of transactions for user authentication with the registered authentication devices. Once device registration is complete the server 130 will accept a token generated by the local authentication device as a valid authentication token.

Turning to the specific details shown in FIG. 5, which shows a browser-based implementation, the user enters the uniform resource locator (URL) of the server 130 in the browser 104. In an implementation which uses a stand alone application or mobile device app (rather than a browser), the user may enter a network address for a network service or the application or app may automatically attempt to connect to the network service at the network address.

For a browser-based implementation, the website embeds a query for registered devices in the HTML page. This may be done in many ways other than embedding the query in an HTML page, such as through Javascript or using HTTP headers. The secure transaction plugin 105 receives the URL and sends it to secure transaction service 101, which searches the looks into the secure storage 120 (which, as discussed, includes a database of authentication device and user information) and determines whether there is a user enrolled within this URL. If so, the secure transaction service 101 sends a list of provisioned devices associated with this URL to the secure transaction plugin 105. The secure transaction plugin then calls the registered JavaScript API and passes this information to the server 130 (e.g., the website). The server 130 chooses the appropriate device from the sent device list, generates a random challenge and sends the device information, and argument back to the client. The website displays the corresponding user interface and asks for authentication from the user. The user then provides the requested authentication measure (e.g., swiping a finger across the fingerprint reader, speaking for voice recognition, etc). The secure transaction service 101 identifies the user (this step can be skipped for devices which don't support storing users), obtains the username from the database, generates an authentication token using the key and sends this information to the website via the secure transaction plugin. The server 130 identifies the user from the secure transaction database 121 and verifies the token by generating the same token on the server 130 (e.g., using its copy of the key). Once verified, the authentication process is complete.

FIG. 6 illustrates a secure transaction following authentication for a browser-based implementation. The secure transaction is designed to provide stronger security for certain types of transactions (e.g., financial transactions). In the illustrated embodiment, the user confirms each transaction prior to committing the transaction. Using the illustrated techniques, the user confirms exactly what he/she wants to commit and commits exactly what he/she sees displayed in the GUI. In other words, this embodiment ensures that the transaction text cannot be modified by a "man in the middle" to commit a transaction which the user did not confirm.

In one embodiment, the secure transaction plugin 105 displays a window 601 in the browser context to show the transaction details. The secure transaction server 101 periodically (e.g., with a random interval) verifies that the text that is shown in the window is not being tampered by anyone.

The following example will help to highlight the operation of this embodiment. A user chooses items for purchase from a merchant site and selects "check out." The merchant site sends the transaction to a service provide which has a secure transaction server 132-133 implementing one or more of the embodiments of the invention described herein (e.g., PayPal). The merchant site authenticates the user and completes the transaction.

The secure transaction server 132-133 receives the transaction details (TD) and puts a "Secure Transaction" request in an HTML page and sends to client 100. The Secure Transaction request includes the transaction details and a random challenge (e.g., a random nonce). The secure transaction plugin 105 detects the request for transaction confirmation message and forwards all data to the secure transaction service 101. In an embodiment which does not use a browser or plugin, the information may be sent directly from the secure transaction servers to the secure transaction service on the client 100.

For a browser-based implementation, the secure transaction plugin 105 displays a window 601 with transaction details to the user (in a browser context) and asks the user to provide authentication to confirm the transaction. In an embodiment which does not use a browser or plugin, the secure transaction service 101 or application 154 may display the window 601. The secure transaction service 101 starts a timer and verifies the content of the window 601 being displayed to the user. The period of verification may be randomly chosen. The secure transaction service 101 ensures that user sees the valid transaction details in the window 601. If it detects that the content has been tampered with it prevents the confirmation token from being generated.

After the user provides valid authentication (e.g., swipes a finger on the fingerprint sensor), the device identifies the user and generates a token (cryptographic signature) with the transaction details and the random challenge (i.e., the token is calculated over the transaction details and the nonce). This allows the secure transaction server 132-133 to ensure that the transaction details have not been modified between the server and the client. The secure transaction service 101 sends the generated token and username to the secure transaction plugin 105 which forwards the token to the secure transaction server 132-133. The secure transaction server 132-133 identifies the user with the username and verifies the token. If verification succeeds, a confirmation message is sent to the client and the transaction is processed.

System and Method for a Secure Query Policy to Determine Client Authentication Capabilities As mentioned, one embodiment of the invention implements a query policy in which a secure transaction server transmits a server policy to the client indicating the authentication capabilities accepted by the server. The client then analyzes the server policy to identify a subset of authentication capabilities which it supports and/or which the user has indicated a desire to use. The client then registers and/or authenticates the user using the subset of authentication tokens matching the provided policy. Consequently, there is a lower impact to the client's privacy because the client is not required to transmit exhaustive information about its authentication capabilities (e.g., all of its authentication devices) or other information which might be used to uniquely identify the client.

By way of example, and not limitation, the client may include numerous authentication capabilities such as a fingerprint sensor, voice recognition capabilities, facial recognition capabilities, eye/optical recognition capabilities, a trusted platform module (TPM), and smartcard, to name a few. However, for privacy reasons, the user may not wish to divulge the details for all of its capabilities to a requesting server. Thus, using the techniques described herein, the secure transaction server may transmit a server policy to the client indicating that it supports, for example, fingerprint, optical, or smartcard authentication. The client may then compare the server policy against its own authentication capabilities and choose one or more of the available authentication options.

Figure 7:
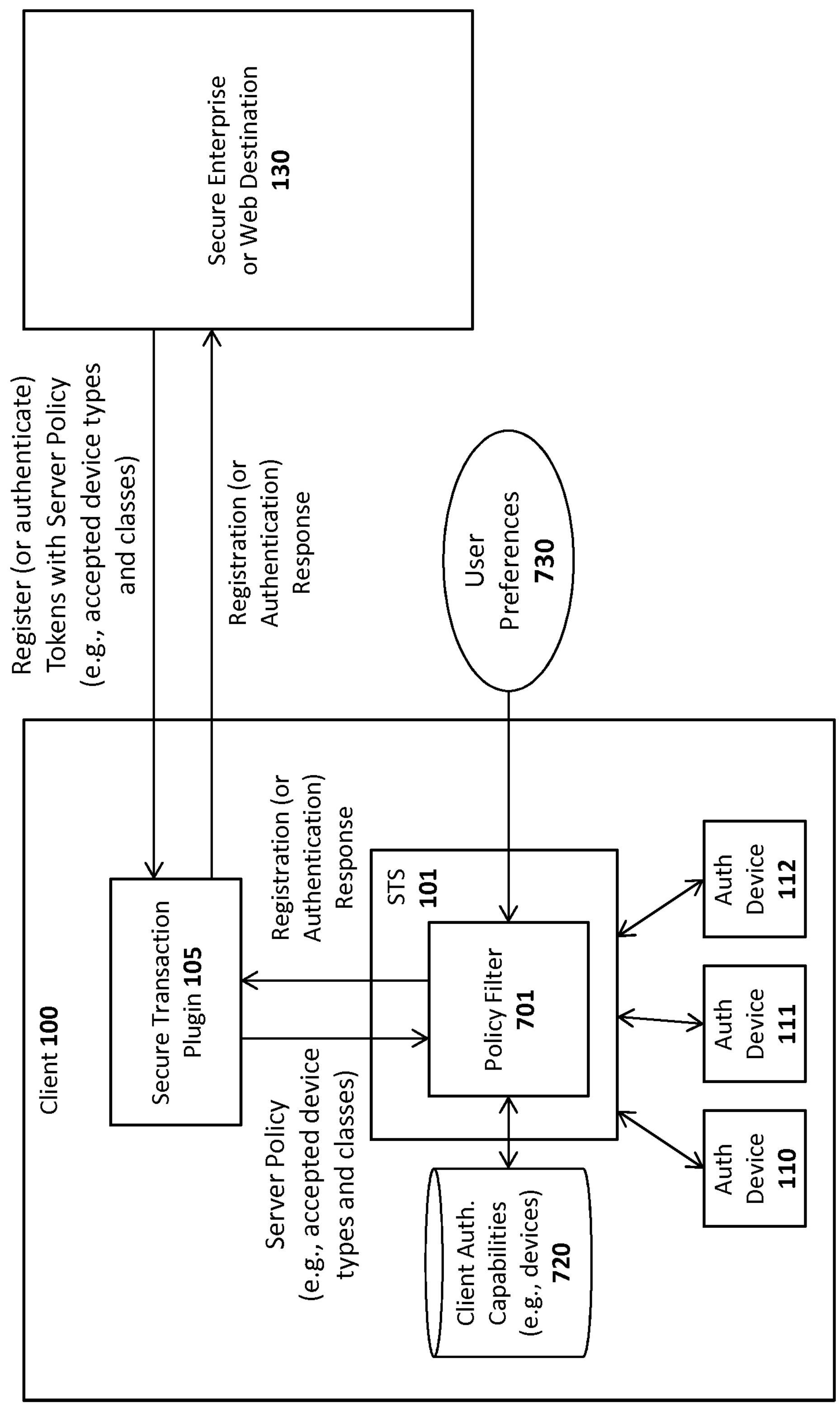
FIG. 7 illustrates a query policy filter implemented in accordance with one embodiment of the invention.

FIG. 7 illustrates one embodiment of a client-server architecture for implementing these techniques. As illustrated, the secure transaction service 101 implemented on the client 100 includes a policy filter 701 for analyzing the policy provided by the server 130 and identifying a subset of authentication capabilities to be used for registration and/or authentication. In one embodiment, the policy filter 701 is implemented as a software module executed within the context of the secure transaction service 101. It should be noted, however, that the policy filter 701 may be implemented in any manner while still complying with the underlying principles of the invention and may include software, hardware, firmware, or any combination thereof.

The particular implementation shown in FIG. 7 includes a secure transaction plugin 105 for establishing communication with the secure enterprise or Web destination 130 (sometimes referred to simply as "server 130") using techniques previously discussed. For example, the secure transaction plugin may identify a specific HTML tag inserted into the HTML code by a web server 131. Thus, in this embodiment, the server policy is provided to the secure transaction plugin 105 which forwards it to the secure transaction service 101 implementing the policy filter 701.

The policy filter 701 may determine the client authentication capabilities by reading the capabilities from the client's secure storage area 720. As previously discussed, the secure storage 720 may comprise a repository of all of the client's authentication capabilities (e.g., identification codes for all of the authentication devices). If the user has already enrolled the user with its authentication devices, the user's enrollment data is stored within the secure storage 720. If the client has already registered an authentication device with a server 130, then the secure storage may also store an encrypted secret key associated with each authentication device.

Using the authentication data extracted from the secure storage 720 and the policy provided by the server, the policy filter 701 may then identify a subset of authentication capabilities to be used. Depending on the configuration, the policy filter 701 may identify a complete list of authentication capabilities supported by both the client and the server or may identify a subset of the complete list. For example, if the server supports authentication capabilities A, B, C, D, and E and the client has authentication capabilities A, B, C, F, and G, then the policy filter 701 may identify the entire subset of common authentication capabilities to the server: A, B, and C. Alternatively, if a higher level of privacy is desired, as indicated by user preferences 730 in FIG. 7, then a more limited subset of authentication capabilities may be identified to the server. For example, the user may indicate that only a single common authentication capability should be identified to the server (e.g., one of A, B or C). In one embodiment, the user may establish a prioritization scheme for all of the authentication capabilities of the client 100 and the policy filter may select the highest priority authentication capability (or a prioritized set of N authentication capabilities) common to both the server and the client.

Depending on what operation has been initiated by server 130 (Registration or Authentication), the secure transaction service 130 performs that operation on the filtered subset of authentication devices (110-112) and sends the operation response back to server 130 via the secure transaction plugin 105 as shown in FIG. 7. Alternatively, in an embodiment which does not rely on a plugin 105 component of a Web browser, the information may be passed directly from the secure transaction service 101 to the server 130.

Figure 8:
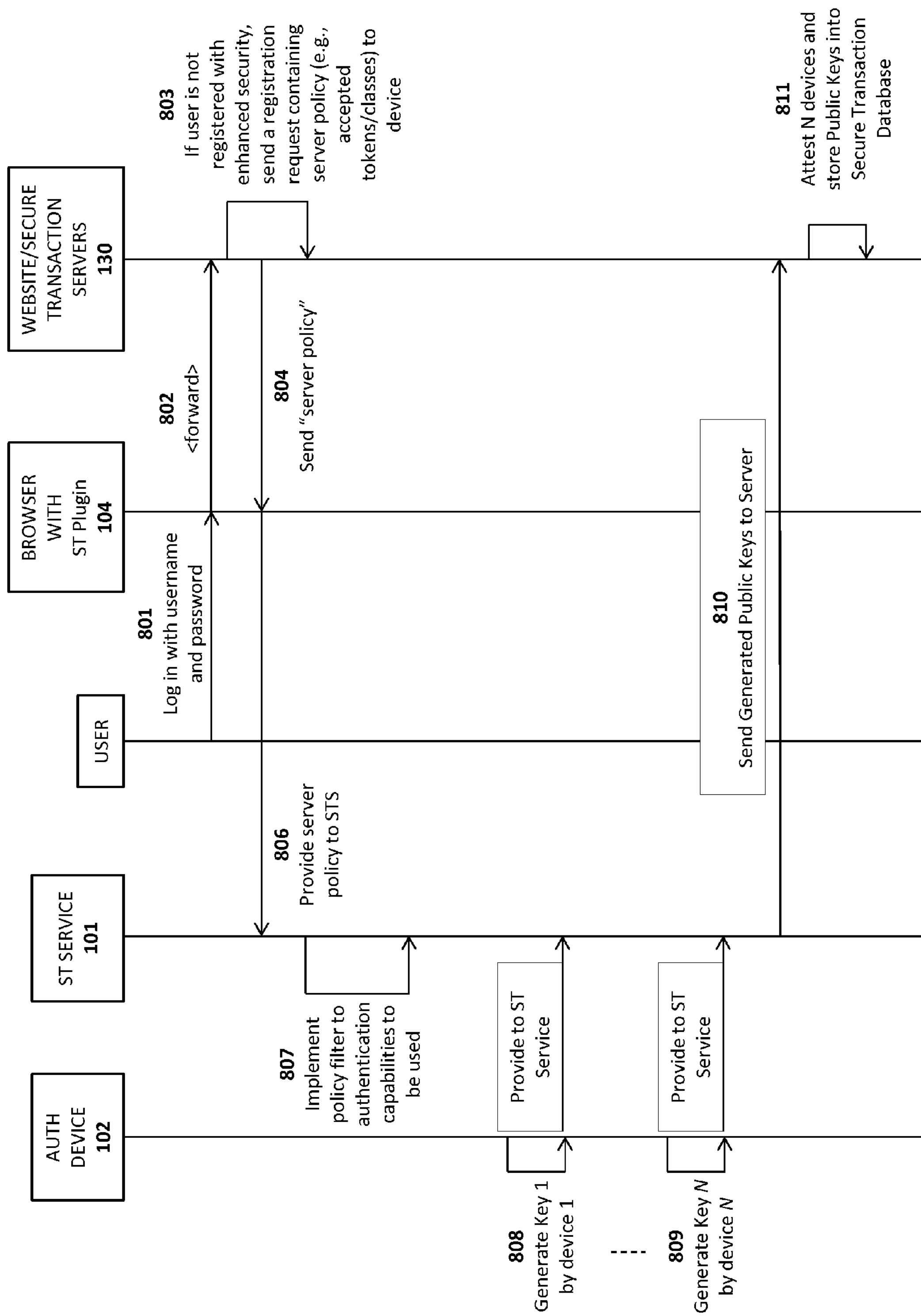
FIG. 8 is a transaction diagram showing how a registration operation with query policy is implemented in one embodiment of the invention.

FIG. 8 illustrates a transaction diagram showing additional details for an exemplary series of registration with query policy transaction. In the illustrated embodiment, the user has not previously registered devices with the server 130. Consequently, at 801 the user may enter a user name and password as an initial, one-time authentication step, which is forwarded at 802 to the server 130 via the client browser 104. It should be noted, however, that a user name and password are not required for complying with the underlying principles of the invention.

Because the user has not previously registered with enhanced security, determined at 803, the server 130 transmits its server policy to the client at 804. As mentioned, the server policy may include an indication of the authentication capabilities supported by the server 130. In the illustrated example, the server policy is passed to the secure transaction service 101 via transaction 806.

At transaction 807, the secure transaction service 101 compares the server policy with the capabilities of the client (and potentially other information such as device priority scheme and/or user preferences as described above) to arrive at a filtered list of authentication capabilities. The filtered list of devices (102) then generate keys (808 and 809) and then provide public parts of these keys to secure transaction service 101 which in its turn sends these as registration response back to server 130. The server attests the authentication devices and stores public keys in secure transaction database. The Token Attestation employed here is the process of validating authentication device identity during registration. It allows server to cryptographically make sure that the device reported by Client is really who it claimed to be.

Alternatively, or in addition, at 807, the user may be provided with an opportunity to review the list and/or select specific authentication capabilities to be used with this particular server 130. For example, the filtered list may indicate the option to use authentication with a fingerprint scan, facial recognition, and/or voice recognition. The user may then choose to use one or more of these options when authenticating with the server 130.

The techniques described above for filtering a server policy at a client may be implemented at various different stages of the series of transactions described above (e.g., during device discovery, device registration, device provisioning, user authentication, etc). That is, the underlying principles of the invention are not limited to the specific set of transactions and the specific transaction ordering set forth in FIG. 8.

Moreover, as previously mentioned, a browser plugin architecture is not required for complying with the underlying principles of the invention. For an architecture which does involve a browser or browser plug-ins (e.g., such as a stand-alone application or mobile device app), the transaction diagram shown in FIG. 8 (and the rest of the transaction diagrams disclosed herein) may be simplified such that the browser 104 is removed, and the secure transaction service 101 communicates directly with the server 130.

System and Method for Efficiently Enrolling, Registering, and Authenticating with Multiple Authentication Devices One embodiment of the invention is capable of enrolling, registering, and authenticating multiple devices at the same time, thereby improving efficiency and the user experience. For example, instead of requesting registration and authentication for a single device at a time, a list of devices may be sent to the client. Symmetric or asymmetric keys may then be registered into multiple devices in one operation, or series of sequential operations executed locally on the client. For authentication, several tokens/devices may be selected concurrently for a given transaction.

Figure 9:
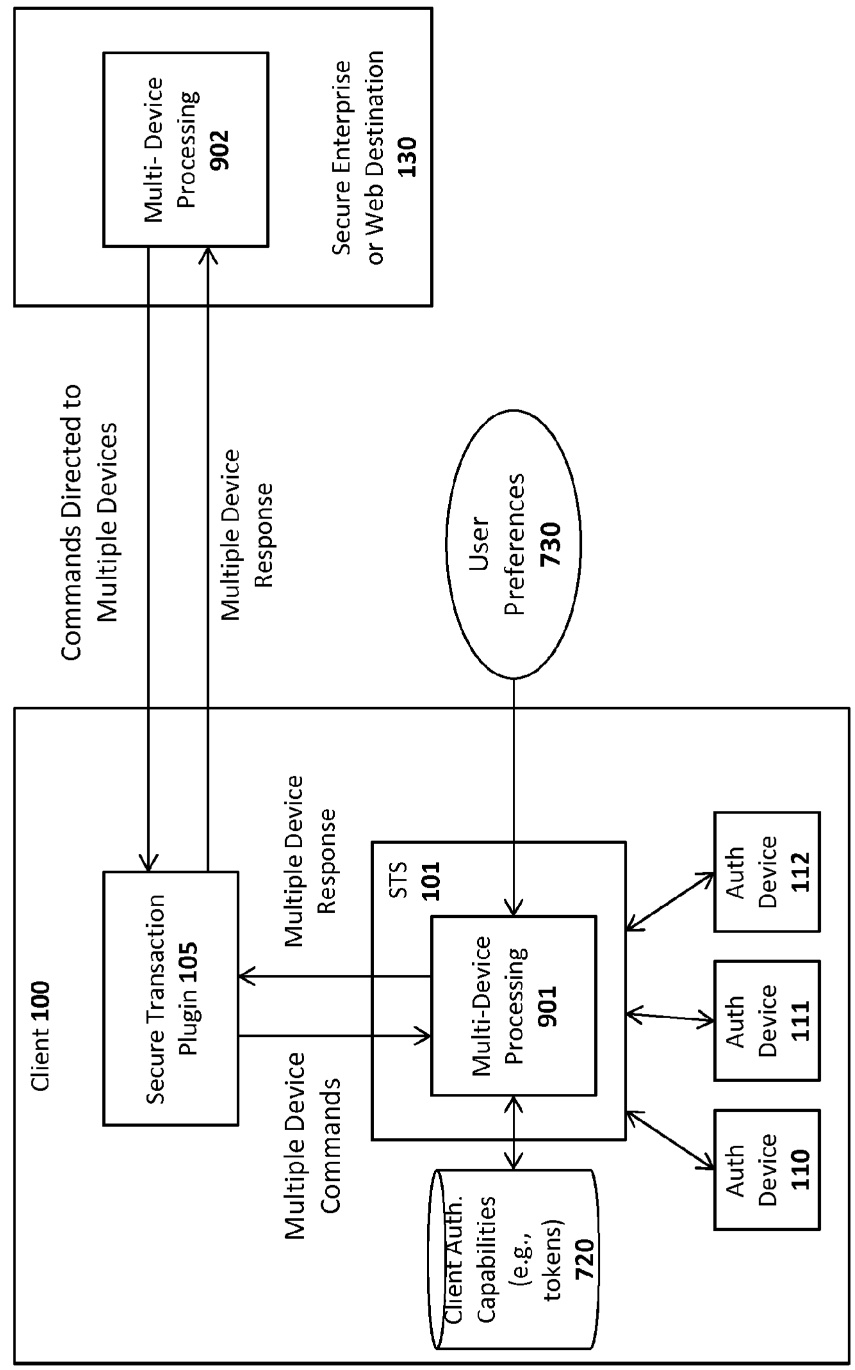
FIG. 9 illustrates one embodiment of an architecture for implementing multiple authentication device processing.

FIG. 9 illustrates one embodiment of a client-server architecture for implementing these techniques. As illustrated, the secure transaction service 101 implemented on the client 100 includes multi-device processing logic 901 for performing specified operations such as enrollment and registration of multiple devices at a time without the need for continual back-and-forth communication with the server 130 as each device is enrolled/registered. Similarly, the server 130 includes multi-device processing logic for issuing commands directed to multiple authentication devices. In one embodiment, the multi-device processing logic 901 is implemented as a software module executed within the context of the secure transaction service 101. It should be noted, however, that the multi-device processing logic 901 may be implemented in any manner while still complying with the underlying principles of the invention and may include software, hardware, or firmware components, or any combination thereof.

As in the embodiments described above, the particular implementation shown in FIG. 9 includes secure transaction plugin 105 for establishing communication with the server 130 (which, as discussed, may include a Website server 131 and secure transaction servers 132-133). Thus, the server 130 communicates with the secure transaction service 101 via the secure transaction plugin 105. As mentioned, however, a browser-based plugin architecture is not required for complying with the underlying principles of the invention.

The multi-device processing logic 902 on the server 130 may communicate commands to be executed by the multi-device processing logic 901 on the client 100 which performs the operations on multiple authentication devices 110-112. By way of example, the multi-device processing logic 902 may generate N keys to be registered with each of N authentication devices and then transmit securely to the multi-device processing logic 901 along with a command to register the N devices. The multi-device processing logic 901 may then perform the registration concurrently or in a series of sequential operations for all N devices (e.g., for authentication devices 110-112) without further interaction with the server. A single response may then be sent to the server 130 to indicate the completed registration of all N devices.

Figure 10A:
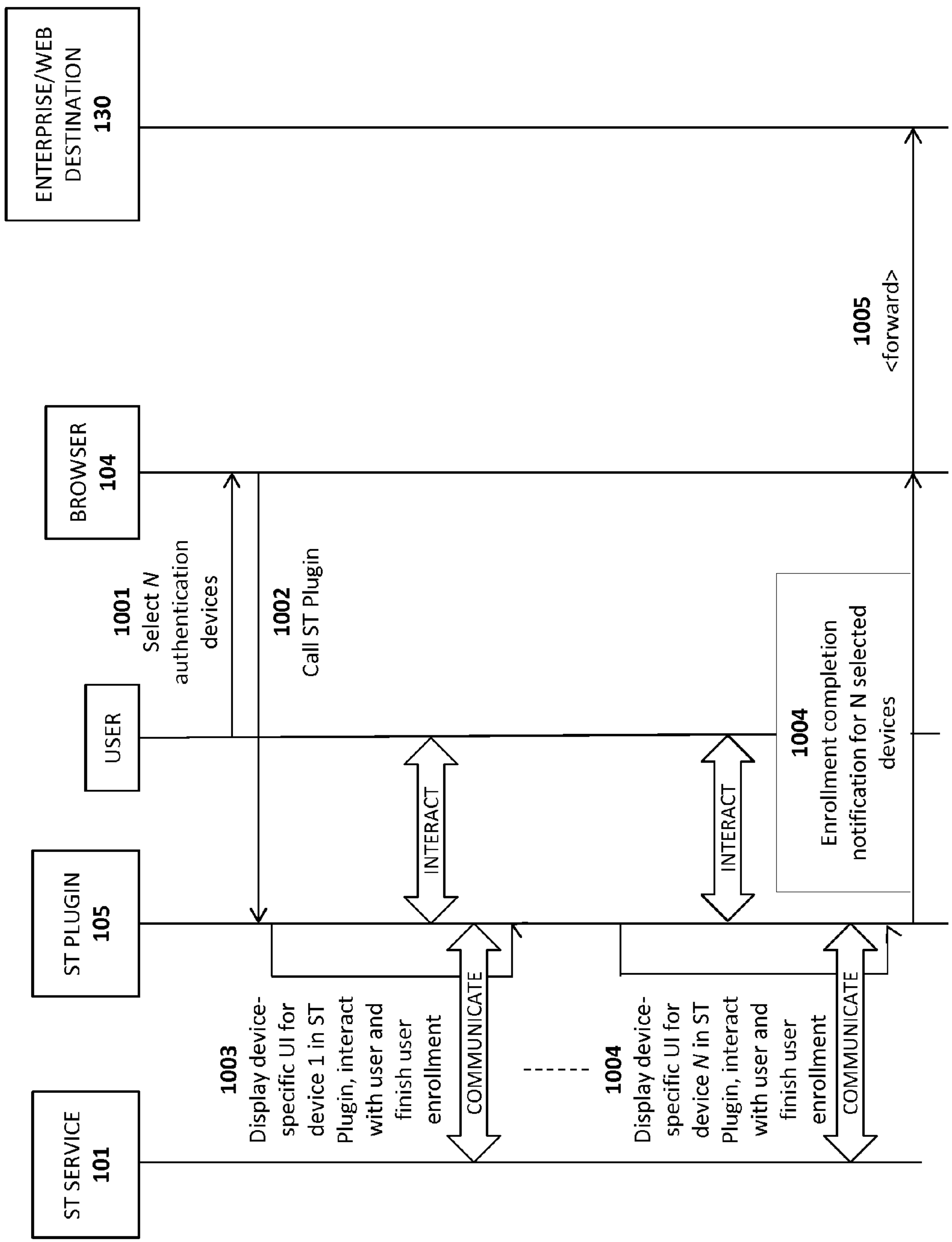
FIG. 10A-C illustrate three embodiments of the invention for multiple authentication device processing.
Figure 10B:
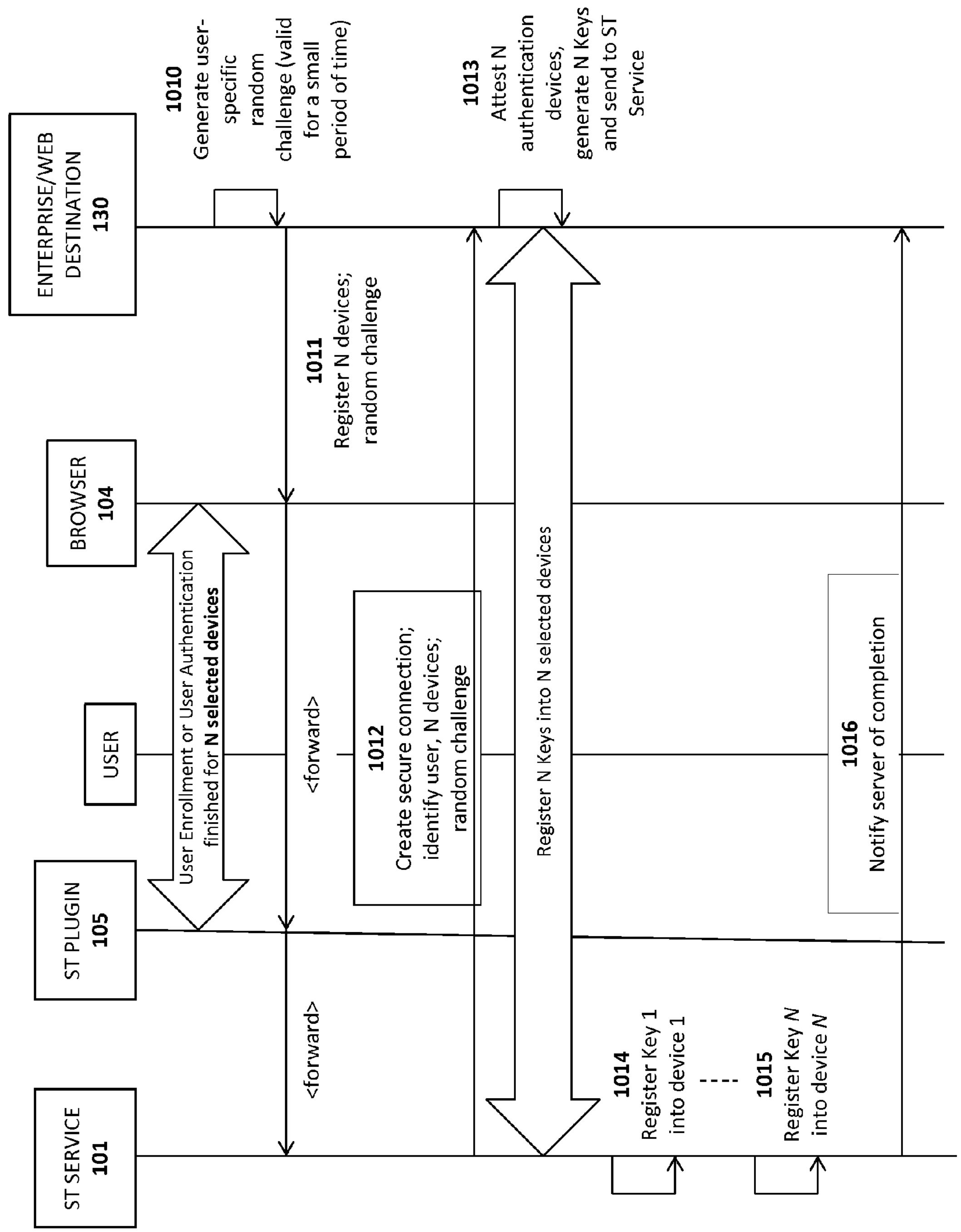
Figure 10C:
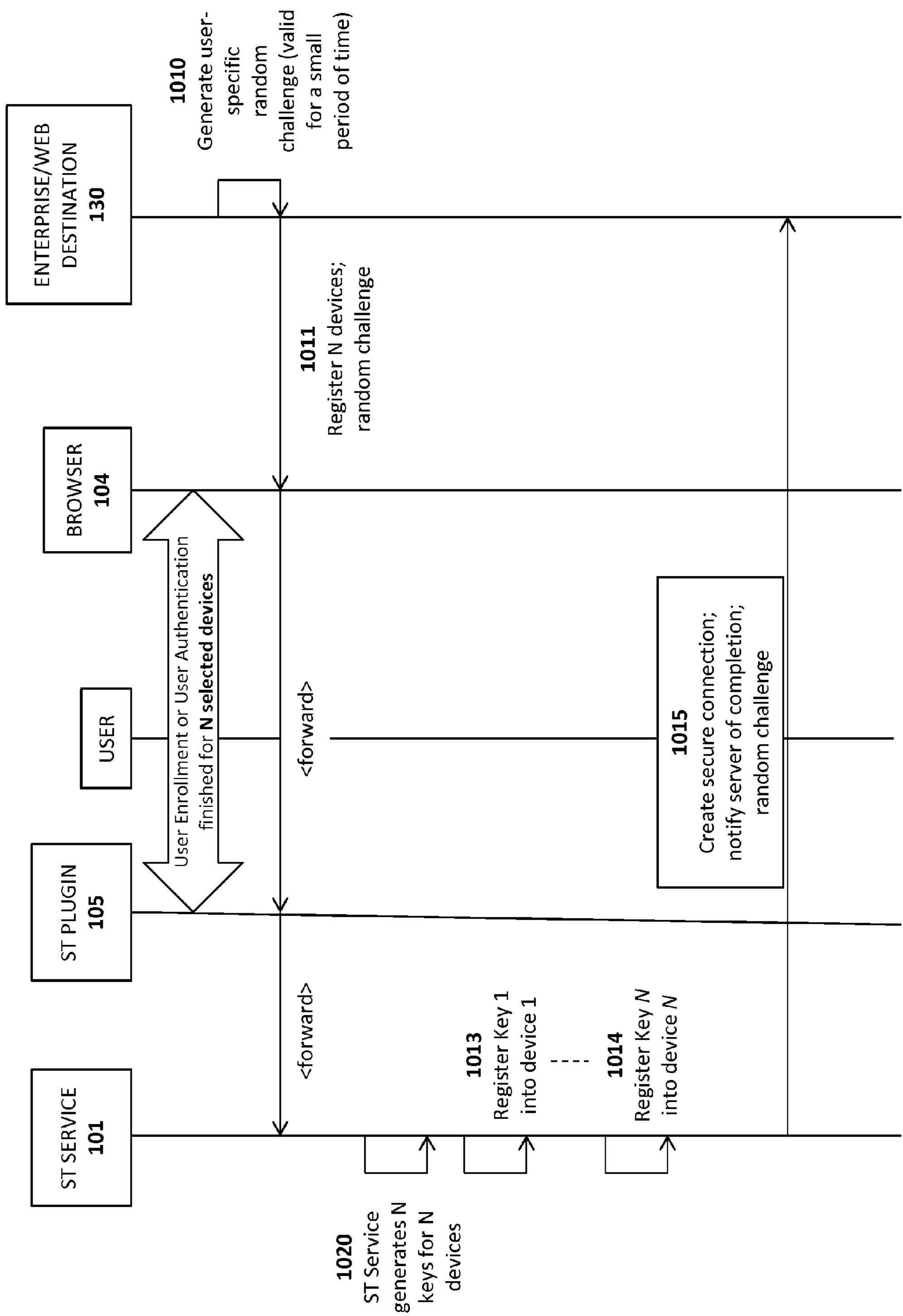

A series of exemplary multiple-device transactions are illustrated in FIGS. 10A-C. FIG. 10A illustrates a multiple-device enrollment process which may be performed without any interaction with the server 130 (e.g., enrolling the user with authentication devices may be performed under the control of the secure transaction service 101 on the client). In an alternate embodiment, the server 130 may transmit a request to the client (now shown) to enroll the user with the N devices. FIGS. 10B-C illustrate two different embodiments for registering multiple devices with the server 130.

Turning to the enrollment process in FIG. 10A, at 1001, the user indicates a desire to enroll with N authentication devices on the client (representing all or a subset of the available authentication devices). In response, the secure transaction plugin is called at 1002 and, at 1003, a device-specific graphical user interface (GUI) is generated to walk the user through the process or enrolling with authentication device #1. During the enrollment process, the user interacts with the secure transaction plugin as indicated (e.g., by positioning a finger over a fingerprint sensor, speaking into a microphone, snapping a picture with the camera, etc). In one embodiment, enrollment is performed for each of the N devices until enrollment is completed for the Nth device at 1004. A different, device-specific script and/or user interface may be presented to the user to enroll the user with each individual authentication device. As previously discussed, as the user enrolls with each device, the user enrollment data may be stored within the secure storage 720 on the client 100 and made accessible only through the secure transaction service 101. Once enrollment for all N devices is complete, a notification may be sent to the server 130 via transactions 1004-1005.

Regardless of how enrollment is performed, once completed, the transaction diagram shown in FIG. 10B may be used to register the N devices with the server 130. At 1010 the server 130 generates a user-specific random challenge which, as previously described, may only be valid for a limited window of time and may comprise a randomly-generated code such as a cryptographic nonce. At 1011, the random challenge is transmitted along with a command to register N authentication devices with the server 130. At 1012, the secure transaction service 101 creates a secure connection with the server 130 and transmits identification data for the N devices, along with the random challenge. In one embodiment, the secure connection is an HTTPS connection. However, the underlying principles of the invention are not limited to any particular secure connection type.

At 1013, the server 130 attests the N devices, generates a key for each of the N devices, and sends the N keys back to the secure transaction service over the secure connection. In one embodiment, the Dynamic Symmetric Key Provisioning Protocol (DSKPP) is used to exchange keys with the client over the secure connection. However, the underlying principles of the invention are not limited to any particular key provisioning techniques. Alternatively, in an embodiment which does not rely on DSKPP protocol, the keys may be generated in each Authentication Device and then transmitted to server 130.

At 1014-1015, the multi-device processing logic of the secure transaction service registers each of the N keys into each of the N devices. As previously described, each key may be stored and associated with its respective device within the secure storage 720 on the client. Once registration is complete for each authentication device, a notification is sent to the server over the secure connection at 1016.

In one embodiment, the keys registered into each authentication device are symmetric keys. Thus, an identical copy of each key is stored in the secure storage 720 on the client and the secure transaction database 121 on the server 130. In an alternate implementation, asymmetric key pairs may be generated, with one of the keys being maintained as a public key in the secure transaction database 121 on the server and the private key being stored in the secure storage 720 of the client. It should be noted, however, that the underlying principles of the invention are not limited to any particular type of encryption keys.

An alternate implementation is illustrated in FIG. 10C in which keys are generated on the client rather than the server 130. In this implementation, after receiving the request to register devices with the random challenge at 1011, the multi-device processing logic of the secure transaction service 101 generates N keys for each of the N devices at 1120. Once generated, the keys are registered with each of the N devices at 1013-1014 and the registration stored within the secure storage 720 as previously described. Once all keys have been registered, the secure transaction service 101 provides a notification to the server at 1015 along with the random challenge (to verify the identity of the client). The server 130 may then store the registration in the secure transaction database 121 as described above.

System and Method for Processing Random Challenges within an Authentication Framework One embodiment of the invention improves the manner in which random challenges are generated by the server and processed. In one embodiment, the random challenge comprises a randomly generated code such as a cryptographic nonce. In current systems, after a server transmits a random challenge to the client, if the client does not respond within a specified timeout period, the random challenge is no longer valid and the client will receive an error in response to a subsequent authentication attempt (e.g., the user will swipe a finger on the fingerprint reader and be denied).

In one embodiment of the invention, the client automatically detects that the challenge has expired and transparently requests a new challenge from the server (i.e., without user intervention). The server then generates a new random challenge and transmits it to the client which may then use it to establish secure communication with the server. The end user experience is improved because the user does not receive an error or denial of an authentication request.

Figure 11A:
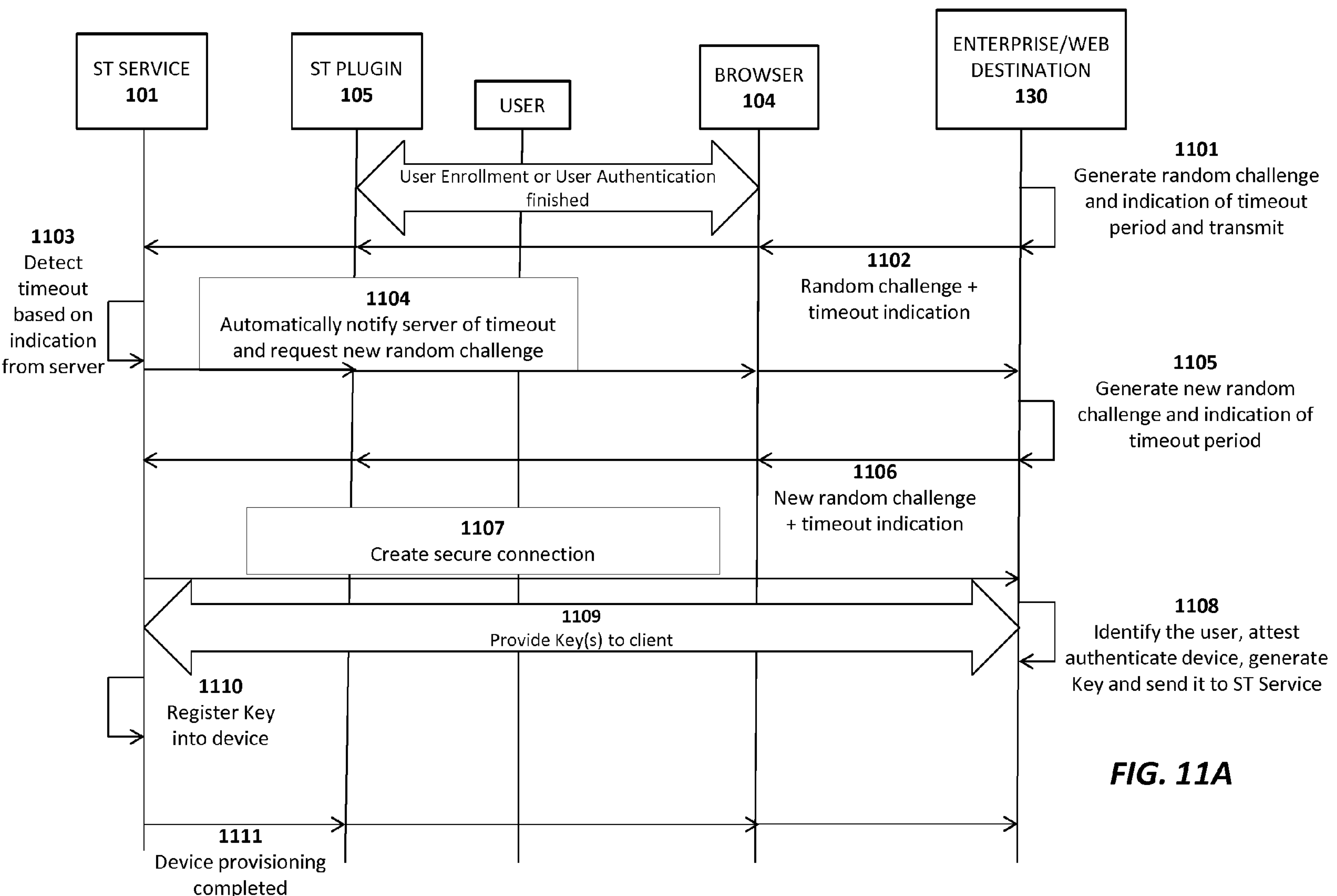
FIGS. 11A-B illustrate a transaction diagram for detecting and responding to a random challenge timeout.
Figure 11B:
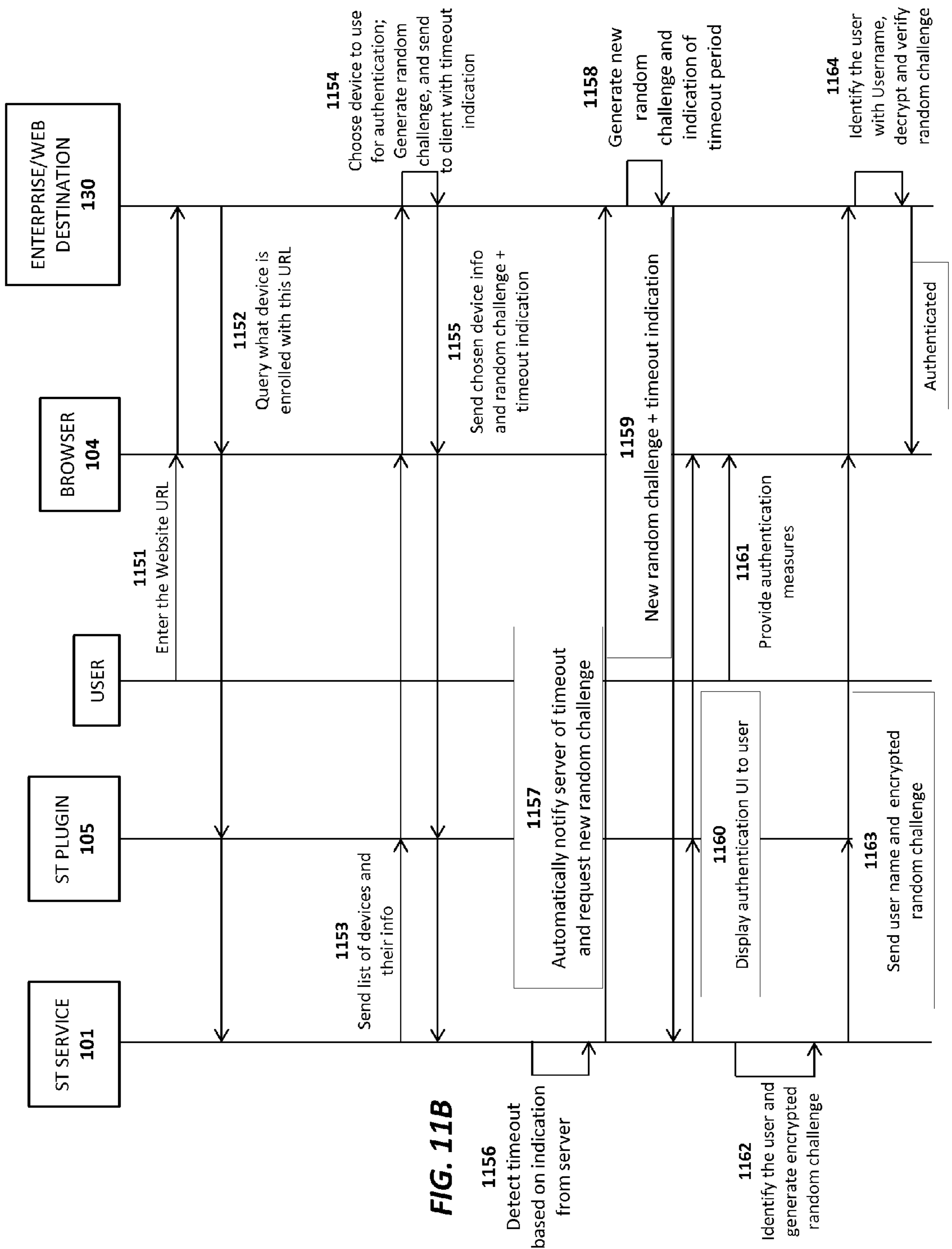

FIG. 11A illustrates one such embodiment which is used within the context of a registration process and FIG. 11B illustrates an embodiment which is used within the context of an authentication process. It should be noted, however, that the underlying principles of the invention may be employed in other contexts than those shown in FIGS. 11A-B. For example, the techniques described herein may be used with any process in which a time-sensitive code is communicated from a server to a client.

Turning first to FIG. 11A, at 1101, the server 130 generates a random challenge and an indication of a timeout period. In one embodiment, the timeout period comprises a period of time for which the random challenge is considered valid. After the timeout period has elapsed, the random challenge is no longer considered valid by the server 130. In one embodiment, the timeout period is specified simply as a point in time at which the random challenge will no longer be valid. Once this point in time is reached, the random challenge is invalid. In another embodiment, the timeout period is specified by using a current timestamp (i.e., the time at which the random challenge is generated by the server 130) and a duration. The secure transaction service 101 may then calculate the timeout time by adding the duration value to the timestamp to calculate the point in time when the random challenge becomes invalid. It should be noted, however, that the underlying principles of the invention are not limited to any specific technique for calculating the timeout period.

Regardless of how the timeout period is specified or calculated, at 1102 the random challenge and the timeout indication are transmitted to the secure transaction service 101 (via the browser 104 and secure transaction plugin 105 in the illustrated example). At 1103, the secure transaction service 101 detects that the random challenge has timed out and is no longer valid based on the timeout indication sent from the server 130. By way of example, the user may have turned off his/her client machine or closed the lid on his/her notebook computer prior to completing the series of transactions. If the transaction is one which requires user interaction, the user may have simply walked away or ignored a message displayed within the GUI.

At 1104, upon detecting that the random challenge is no longer valid, the secure transaction service 101 transmits a request for a new random challenge to the server 130 (via the secure transaction plugin 105 and browser 104 in the illustrated example). At 1105, the server 130 generates a new random challenge and a new indication of the timeout period. In one embodiment, the timeout period is the same as in operation 1101 or may be modified. For example, the server 130 may increase the duration of the timeout period to reduce data traffic with the client or decrease the duration to increase the level of security provided by the random challenge. At 1106, the new random challenge and timeout indication is transmitted to the secure transaction service 101.

The remainder of the transactions occur as previously described. For example, the secure transaction service opens a secure connection directly to the server at 1107 in order to perform device registration and key exchange as discussed above with respect to FIG. 4, FIG. 10B, or FIG. 10C. At 1108, the server 130 identifies the user (e.g., with a user name or other ID), attests the authentication device, and generates a key for the device. As mentioned, the key may be a symmetric key or an asymmetric key. At 1109, the keys are transmitted to the secure transaction service 101 via the secure connection and, at 1110, the secure transaction service 101 registers the key into the authentication device. At 1111, a notification that registration is complete is transmitted to the server 130.

Thus, in the embodiment shown in FIG. 11A, the key used for device registration is generated at the server 130 as in the embodiment shown in FIG. 10B. However, the underlying principles of the invention may also be used in an embodiment in which the key(s) are generated by the secure transaction service 101 on the client 100, such as that described above with respect to FIG. 10C.

FIG. 11B illustrates one embodiment of the invention implemented within the context of an authentication process. At 1151, the user enters a particular website URL into the browser 104 and is directed to the web server 131 within the enterprise/web destination servers 130 which includes the secure transaction servers 132-133. At 1152, a query is sent back to the secure transaction service (via the browser and plugin) to determine which device(s) are registered with the website's URL. The secure transaction service 101 queries the secure storage 720 on the client 100 to identify a list of devices which are sent back to the server 130 at 1153. At 1154, the server 1154 chooses a device to use for authentication, generates a random challenge and a timeout indication and, at 1155, sends this information back to the secure transaction service 101.

At 1156, the secure transaction service 1156 automatically detects that the random challenge is no longer valid upon reaching the end of the timeout period. As mentioned above, various different techniques may be employed for indicating and detecting the end of the timeout period (see FIG. 11A and associated text). Upon detecting the expiration of the random challenge, at 1157, the secure transaction service 101 transparently (i.e., without user intervention) notifies the server 130 and requests a new random challenge. In response, at 1158, the server 130 generates a new random challenge and a new indication of the timeout period. As mentioned, the new timeout period may be the same as previously sent to the client or may be modified. In either case, at 1159, the new random challenge and timeout indication are sent to the secure transaction service 101.

The remainder of the transaction diagram shown in FIG. 11B operates in substantially the same manner as described above (see, e.g., FIG. 5). For example, at 1160, an authentication user interface is displayed (e.g., directing the user to swipe a finger on a fingerprint sensor) and, at 1161, the user provides authentication (e.g., swipes a finger on the fingerprint scanner). At 1162, the secure transaction service verifies the identity of the user (e.g., comparing the authentication data collected from the user with that stored in the secure storage 720) and uses the key associated with the authentication device to encrypt the random challenge. At 1163, the user name (or other ID code) and the encrypted random challenge are sent to the server 130. Finally, at 1164, the server 130 identifies the user within the secure transaction database 121 using the user name (or other ID code), and decrypts/verifies the random challenge using the key stored in the secure transaction database 121 to complete the authentication process.

System and Method for Implementing Privacy Classes within an Authentication Framework In one embodiment, multiple classes of privacy protection may be predefined, selected and/or modified by the end user. The privacy classes may be defined based on the probability with which a client can be identified using the divulged information. At privacy classes having relatively higher privacy levels, relatively less information about the client device is divulged to perform the authentication techniques described herein. In one embodiment, the user may choose to disclose the least amount of information possible when communicating with different servers (i.e., may choose transactions having the lowest allowable privacy impact for each website or network service).

Figure 12:
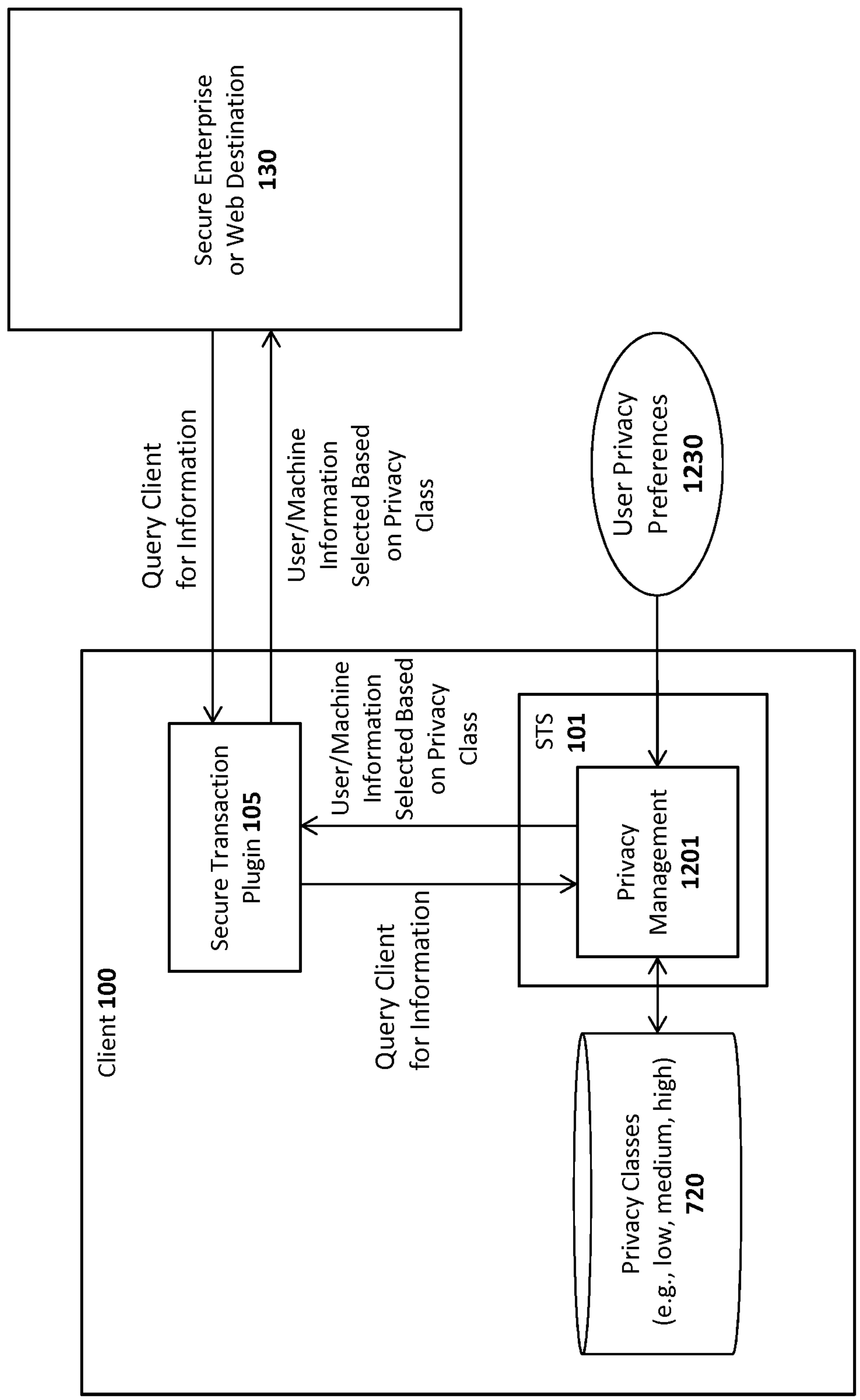
FIG. 12 illustrates an architecture for implementing privacy classes in accordance with one embodiment of the invention.

FIG. 12 illustrates a high level architecture for implementing privacy classes. As illustrated, the secure transaction service 101 of this embodiment includes privacy management logic 1201 for analyzing queries received from the server 130 for client information such as information related to authentication devices, implementing a privacy policy in response to such queries, and generating a response containing client information collected based on the particular privacy class in use. In one embodiment, the privacy management module 1201 is implemented as a software module executed within the context of the secure transaction service 101. It should be noted, however, that the privacy management module 1201 may be implemented in any manner while still complying with the underlying principles of the invention and may include software, hardware, firmware, or any combination thereof.

The privacy classes utilized by the privacy management logic 1201 may be pre-specified and stored on the client 100 (e.g., within stored within secure storage 720). In one embodiment, three privacy classes are defined: high privacy impact, medium privacy impact, and low privacy impact. Each privacy class may be defined based on a probability with which the divulged information could be used to uniquely identify a user/client. For example, the information divulged for a low privacy impact transaction may result in a 10% probability of the user or machine being uniquely identified over internet; a medium privacy impact transaction may result in a 50% probability of the user or machine being uniquely identified; and a high privacy impact transaction may result in a 100% probability of the user or machine being uniquely identified. Various other privacy class levels may be defined while still complying with the underlying principles of the invention.

In one embodiment, each relying party (e.g., each website 131 or service 151) may specify a required privacy class or other privacy threshold. For example, websites and services requiring a heightened level of security may only allow communication in accordance with the high privacy impact class whereas other websites/services may permit interactions using the medium privacy impact or low privacy impact class. In one embodiment, the query for client information sent from the server 130 includes an attribute specifying which privacy classes of information should be retrieved (i.e. low, medium, high). Thus, the privacy management logic 1201 will store information for the highest approved privacy class for each relying party. In one embodiment, whenever the relying party asks for information belonging to a higher privacy class than the one already approved, the user will be prompted to permanently approve (or reject) this new privacy class for this relying party. In response to the user's approval, the privacy management logic may store the new association between the relying party (e.g., identified via a URL) and the new privacy class.

While the user preferences 1230 are applied directly to the privacy management logic in FIG. 12 for simplicity, it should be noted that the user may specify preferences via a browser-based graphical user interface (not shown). In such a case, the user would enter privacy setting via a browser window. The secure transaction plugin 105 would then store the new settings to the privacy management logic 1201, or to a configuration data file accessible by the privacy management logic 1201. In short, the underlying principles of the invention are not limited to any particular mechanism for configuring the privacy management logic.

Various types of client data may be specified at the various privacy class levels including, for example, a machine model identifier, client software information, client capabilities, and various levels of information related to each authentication device configured on the client device (e.g., device ID codes, vendor ID codes, device class ID, etc). Different combinations of this information may be gathered to determine the percentages specified above defining the different privacy classes.

Figure 13:
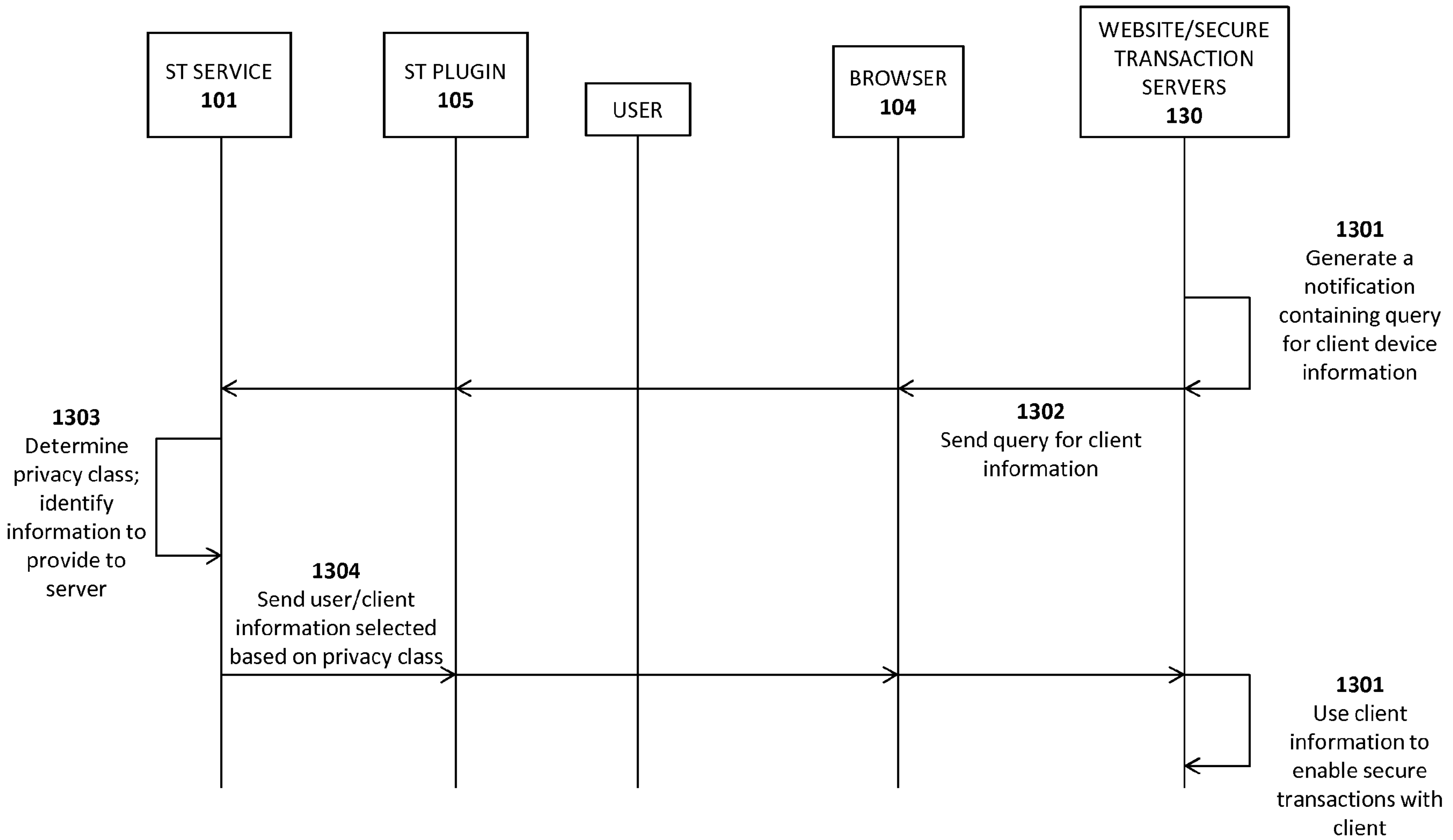
FIG. 13 is a transaction diagram for implementing privacy classes in accordance with one embodiment of the invention.

FIG. 13 illustrates a series of transactions for providing information to a requesting party using defined privacy classes. At 1301 the server 130 generates a notification containing a query for client device information. At 1302, the query is sent to the client and ultimately received by the secure transaction service 101. At 1303, the privacy management logic of the secure transaction service determines a privacy class for the response and collects the necessary information. As mentioned above, N different privacy class levels may be defined and the secure transaction service 101 may choose the one which complies with the requirements of the requesting party while at the same time divulges as little information as possible regarding the client. At 1304, the collected information is sent to the server 130 and at 1305, the server uses the information for one or more subsequent transactions with the client.

System and Method for Implementing an Authentication Framework Using Transaction Signing One embodiment of the invention employs transaction signing on the secure transaction server so that no transaction state needs to be maintained on the server to maintain sessions with clients. In particular, transaction details such as transaction text may be sent to the client signed by server. The server may then verify that the signed transaction responses received by the client are valid by verifying the signature. The server does not need to persistently store the transaction content, which would consume a significant amount of storage space for a large number of clients and would open possibility for denial of service type attacks on server.

Figure 14:
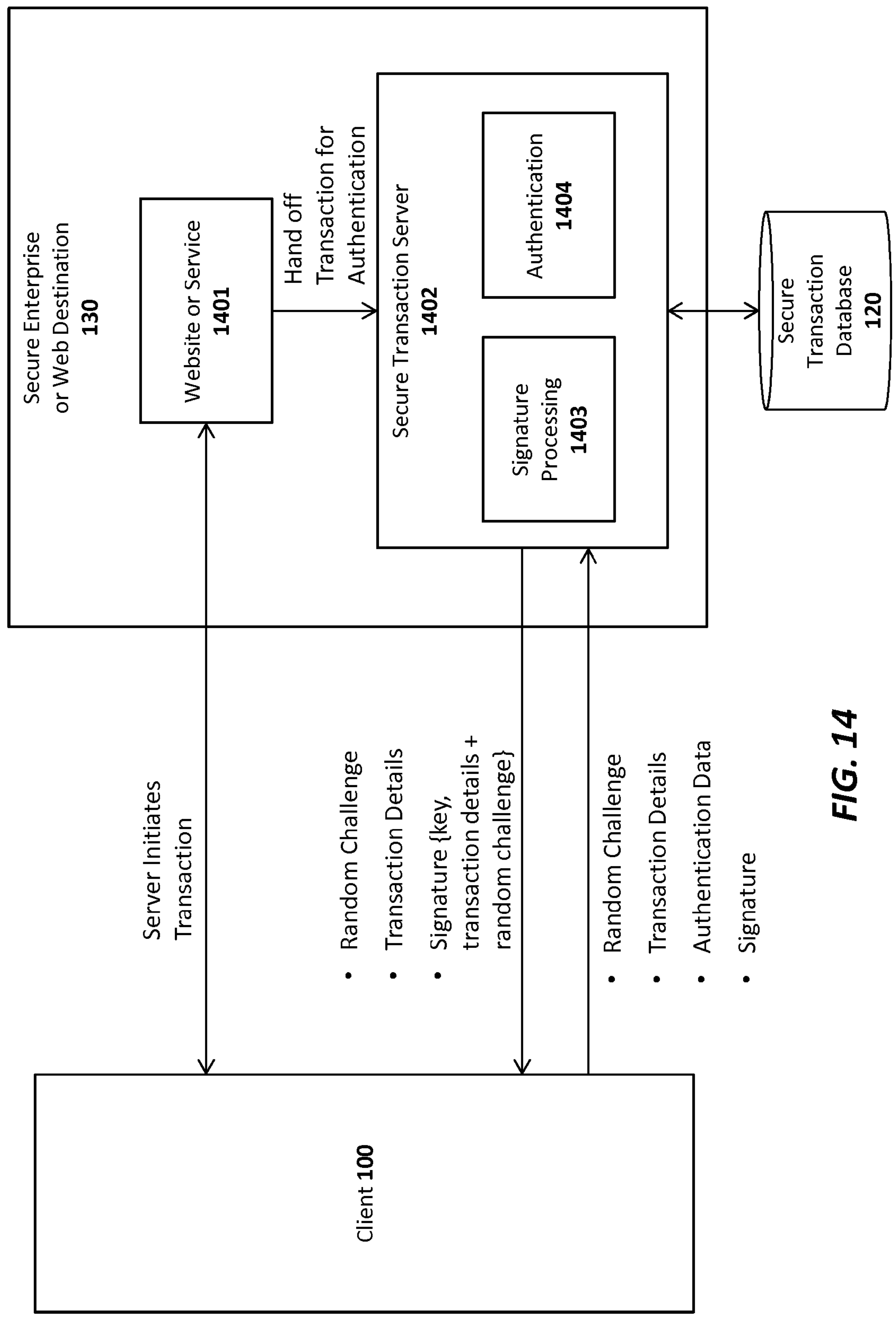
FIG. 14 illustrates one embodiment of an architecture for using signatures to authenticate and a transaction.

One embodiment of the invention is illustrated in FIG. 14 which shows a website or other network service (1401) initiating a transaction with a client 100. For example, the user may have selected items for purchase on the website and may be ready to check out and pay. In the illustrated example, the website or service 1401 hands off the transaction to a secure transaction server 1402 which includes signature processing logic 1403 for generating and verifying signatures (as described herein) and authentication logic for performing client authentication 1404 (e.g., using the authentication techniques previously described).

In one embodiment, the authentication request sent from the secure transaction server 1402 to the client 100 includes the random challenge such as a cryptographic nonce (as described above), the transaction details (e.g., the specific text presented to complete the transaction), and a signature generated by the signature processing logic 1403 over the random challenge and the transaction details using a private key (known only by the secure transaction server).

Once the above information is received by the client, the user may receive an indication that authentication is required to complete the transaction. In response, the user may, for example, swipe a finger across a fingerprint scanner, snap a picture, speak into a microphone, or perform any other type of authentication permitted for the given transaction. In one embodiment, once the user has successfully authenticated on the client 100, the client transmits the following back to the server: (1) the random challenge and transaction text (both previously provided to the client by the server), (2) authentication data proving that the user successfully completed authentication, and (3) the signature.

The authentication module 1404 on the secure transaction server 1402 may then confirm that the user has correctly authenticated and the signature processing logic 1403 re-generates the signature over the random challenge and the transaction text using the private key. If the signature matches the one sent by the client, then the server can verify that the transaction text is the same as it was when initially received from the website or service 1401. Storage and processing resources are conserved because the secure transaction server 1402 is not required to persistently store the transaction text (or other transaction data) within the secure transaction database 121.

Exemplary Data Processing Devices

Figure 15:
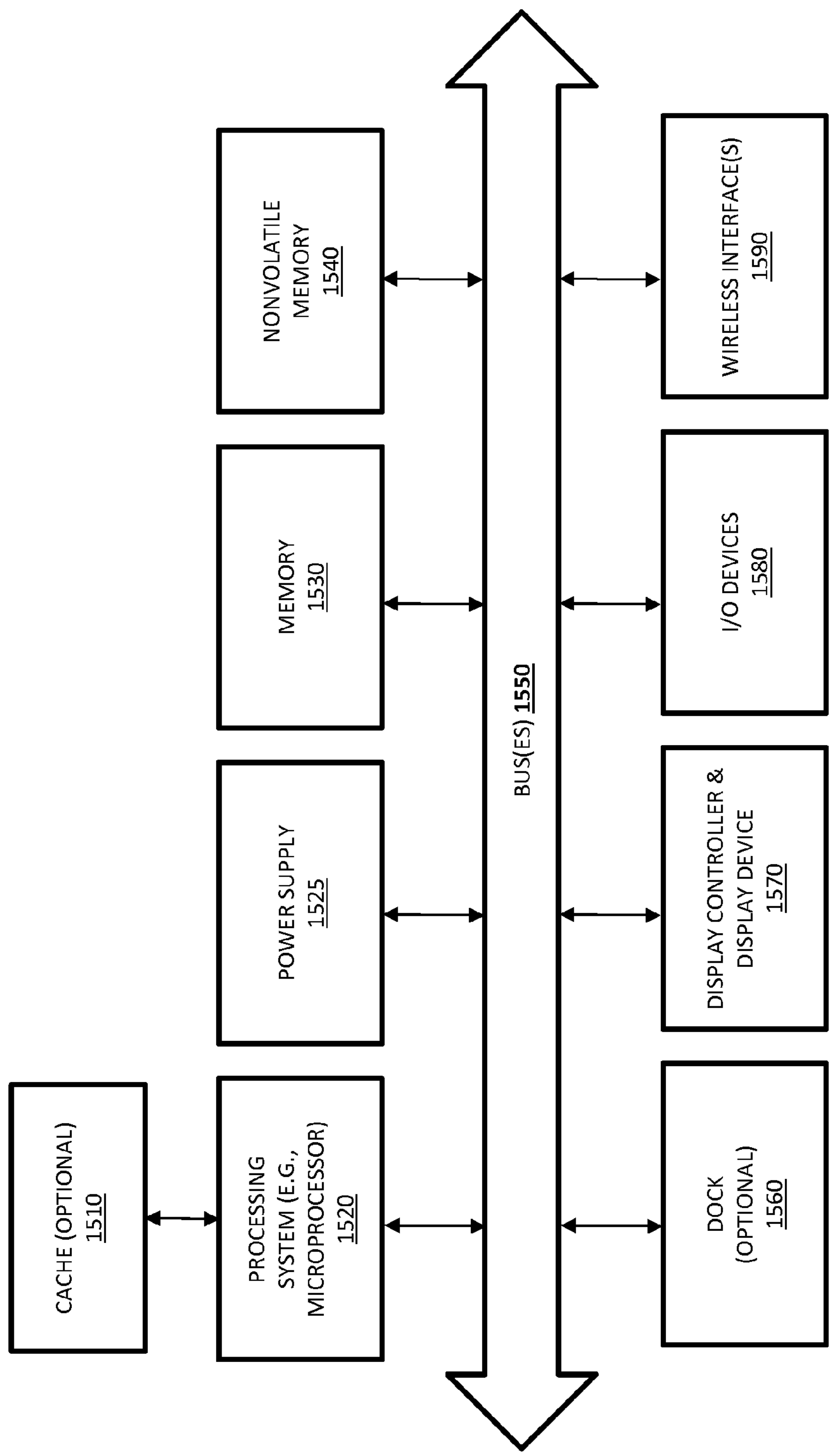
FIGS. 15-16 illustrate exemplary embodiments of a computer system for executing embodiments of the invention.

FIG. 15 is a block diagram illustrating an exemplary clients and servers which may be used in some embodiments of the invention. It should be understood that while FIG. 15 illustrates various components of a computer system, it is not intended to represent any particular architecture or manner of interconnecting the components as such details are not germane to the present invention. It will be appreciated that other computer systems that have fewer components or more components may also be used with the present invention.

As illustrated in FIG. 15, the computer system 1500, which is a form of a data processing system, includes the bus(es) 1550 which is coupled with the processing system 1520, power supply 1525, memory 1530, and the nonvolatile memory 1540 (e.g., a hard drive, flash memory, Phase-Change Memory (PCM), etc.). The bus(es) 1550 may be connected to each other through various bridges, controllers, and/or adapters as is well known in the art. The processing system 1520 may retrieve instruction(s) from the memory 1530 and/or the nonvolatile memory 1540, and execute the instructions to perform operations as described above. The bus 1550 interconnects the above components together and also interconnects those components to the optional dock 1560, the display controller & display device 1570, Input/Output devices 1580 (e.g., NIC (Network Interface Card), a cursor control (e.g., mouse, touchscreen, touchpad, etc.), a keyboard, etc.), and the optional wireless transceiver(s) 1590 (e.g., Bluetooth, WiFi, Infrared, etc.).

Figure 16:
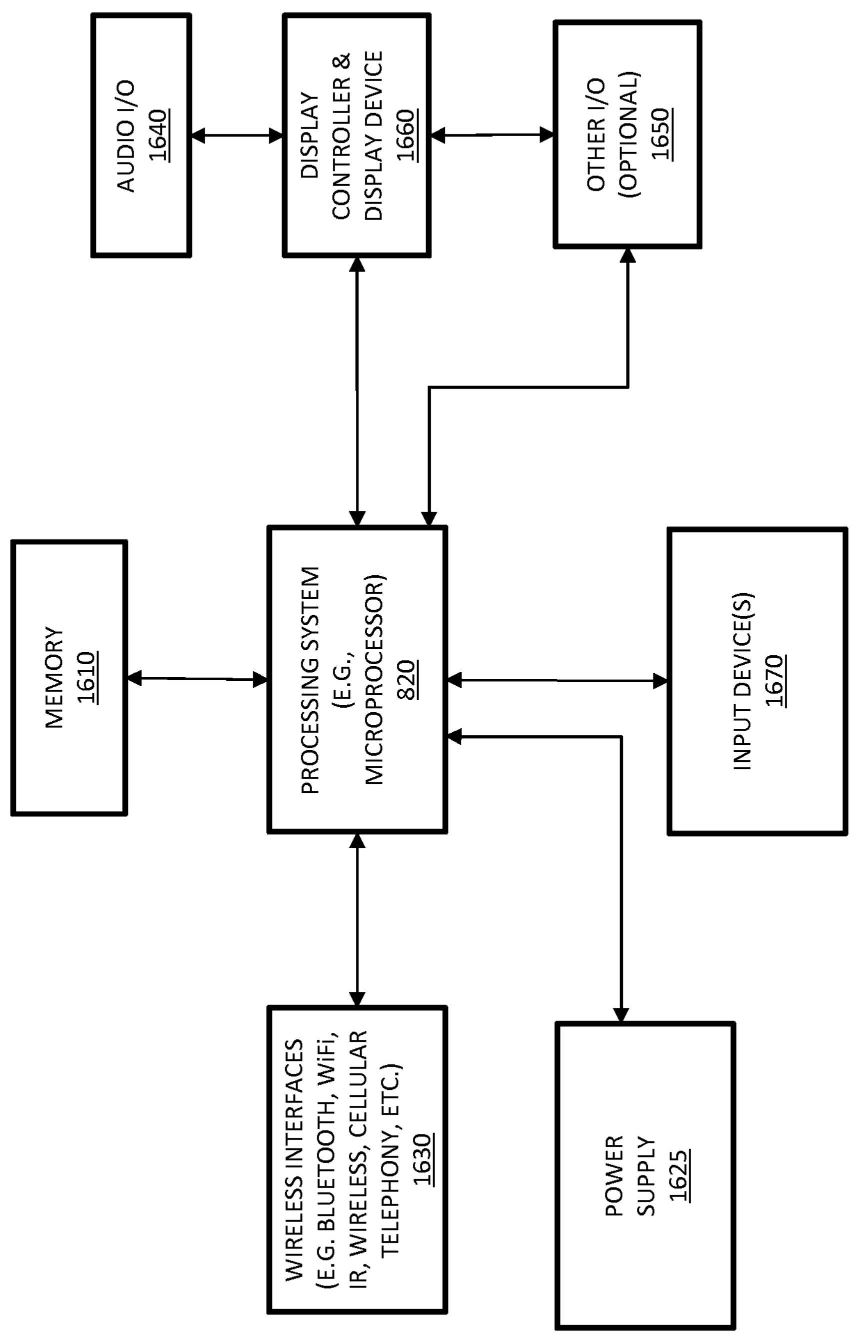

FIG. 16 is a block diagram illustrating an exemplary data processing system which may be used in some embodiments of the invention. For example, the data processing system 1600 may be a handheld computer, a personal digital assistant (PDA), a mobile telephone, a portable gaming system, a portable media player, a tablet or a handheld computing device which may include a mobile telephone, a media player, and/or a gaming system. As another example, the data processing system 1600 may be a network computer or an embedded processing device within another device.

According to one embodiment of the invention, the exemplary architecture of the data processing system 1600 may used for the mobile devices described above. The data processing system 1600 includes the processing system 1620, which may include one or more microprocessors and/or a system on an integrated circuit. The processing system 1620 is coupled with a memory 1610, a power supply 1625 (which includes one or more batteries) an audio input/output 1640, a display controller and display device 1660, optional input/output 1650, input device(s) 1670, and wireless transceiver(s) 1630. It will be appreciated that additional components, not shown in FIG. 16, may also be a part of the data processing system 1600 in certain embodiments of the invention, and in certain embodiments of the invention fewer components than shown in FIG. 16 may be used. In addition, it will be appreciated that one or more buses, not shown in FIG. 16, may be used to interconnect the various components as is well known in the art.

The memory 1610 may store data and/or programs for execution by the data processing system 1600. The audio input/output 1640 may include a microphone and/or a speaker to, for example, play music and/or provide telephony functionality through the speaker and microphone. The display controller and display device 1660 may include a graphical user interface (GUI). The wireless (e.g., RF) transceivers 1630 (e.g., a WiFi transceiver, an infrared transceiver, a Bluetooth transceiver, a wireless cellular telephony transceiver, etc.) may be used to communicate with other data processing systems. The one or more input devices 1670 allow a user to provide input to the system. These input devices may be a keypad, keyboard, touch panel, multi touch panel, etc. The optional other input/output 1650 may be a connector for a dock.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable program code. The machine-readable medium may include, but is not limited to, floppy diskettes, optical disks, CD-ROMs, and magneto-optical disks, ROMs, RAMs, EPROMs, EEPROMs, magnetic or optical cards, or other type of media/machine-readable medium suitable for storing electronic program code.

Throughout the foregoing description, for the purposes of explanation, numerous specific details were set forth in order to provide a thorough understanding of the invention. It will be apparent, however, to one skilled in the art that the invention may be practiced without some of these specific details. For example, it will be readily apparent to those of skill in the art that the functional modules and methods described herein may be implemented as software, hardware or any combination thereof. Moreover, although some embodiments of the invention are described herein within the context of a mobile computing environment, the underlying principles of the invention are not limited to a mobile computing implementation. Virtually any type of client or peer data processing devices may be used in some embodiments including, for example, desktop or workstation computers. Accordingly, the scope and spirit of the invention should be judged in terms of the claims which follow.

We claim:

1. A method comprising:

generating a first random challenge comprising a first randomly-generated code at a server;

transmitting the first random challenge and an indication of a timeout period associated with the first random challenge from the server to a client;

automatically detecting at the client that the first random challenge comprising the first random code is no longer valid based on the timeout period;

responsively transmitting a request for a new random challenge from the client to the server, wherein transmitting is performed without user intervention;

generating a new random challenge comprising a new randomly-generated code at the server responsive to the request for the new random challenge received from the client, and transmitting the new randomly-generated code and an indication of a timeout period associated with the new random challenge to the client;

using the new randomly-generated code when registering one or more authentication devices on the client with the server or a different server and/or when authenticating the user with the server or a different server using the one or more authentication devices, wherein during the operations of registering the authentication devices or authenticating the user, the new randomly-generated code, a signature generated over the new randomly-generated code, and/or an encrypted version of the new randomly-generated code, is transmitted from the client to the server, and validating the new randomly-generated code at the server to confirm the operations of registering the authentication devices and/or authenticating the user.

2. The method as in claim 1 wherein the first and new random challenges comprise random numbers or random ID codes generated by the server.

3. The method as in claim 2 wherein the first and new randomly-generated codes comprise cryptographic nonces.

4. The method as in claim 1 further comprising:

transmitting the new randomly-generated code from the client to the server to establish a secure connection between the client and the server.

5. The method as in claim 1 wherein the encrypted version of the new randomly-generated code is encrypted using a key associated with an authenticator on the client.

6. The method as in claim 5 further comprising:

collecting biometric authentication data from a user using a biometric authentication device on the client;

confirming the identity of the user with the biometric authentication data prior to the new random challenge becoming invalid due to expiration of the time period; and transmitting the new authentication data to the server with the new random challenge.

7. The method as in claim 6 wherein the server verifies the identity of the user and decrypts the new randomly-generated code using a key corresponding to the biometric authentication device.

8. The method as in claim 1 wherein the indication of the timeout period comprises an amount of time after which the first randomly-generated code becomes invalid.

9. The method as in claim 8 wherein the indication of the timeout period includes a timestamp associated with the transmission of the first randomly-generated code from the server to the client.

10. The method as in claim 1 wherein the indication of the timeout period comprises a specific time.

11. A system comprising a non-transitory machine-readable medium for storing program code and a processor for processing the program code to perform the operations of:

generating a first random challenge comprising a first randomly-generated code at a server;

transmitting the first random challenge and an indication of a timeout period associated with the first random challenge from the server to a client;

automatically detecting at the client that the first random challenge comprising the first random code is no longer valid based on the timeout period;

responsively transmitting a request for a new random challenge from the client to the server, wherein transmitting is performed without user intervention;

generating a new random challenge comprising a new randomly-generated code at the server responsive to the request for the new random challenge received from the client, and transmitting the new randomly-generated code and an indication of a timeout period associated with the new random challenge to the client;

using the new randomly-generated code when registering one or more authentication devices on the client with the server or a different server and/or when authenticating the user with the server or a different server using the one or more authentication devices, wherein during the operations of registering the authentication devices or authenticating the user, the new randomly-generated code, a signature generated over the new randomly-generated code, and/or an encrypted version of the new randomly-generated code, is transmitted from the client to the server, and validating the new randomly-generated code at the server to confirm the operations of registering the authentication devices and/or authenticating the user.

12. The system as in claim 11 wherein the first and new random challenges comprise random numbers or random ID codes generated by the server.

13. The system as in claim 12 wherein the first and new randomly-generated codes comprise cryptographic nonces.

14. The system as in claim 11 further comprising program code to cause the processor to perform the operations of:

transmitting the new randomly-generated code from the client to the server to establish a secure connection between the client and the server.

15. The system as in claim 11 wherein the encrypted version of the new randomly-generated code is encrypted using a key associated with an authenticator on the client.

16. The system as in claim 15 further comprising program code to cause the processor to perform the operations of:

collecting biometric authentication data from a user using a biometric authentication device on the client;

confirming the identity of the user with the biometric authentication data prior to the new random challenge becoming invalid due to expiration of the time period; and transmitting the new authentication data to the server with the new random challenge.

17. The system as in claim 16 wherein the server verifies the identity of the user and decrypts the new randomly-generated code using a key corresponding to the biometric authentication device.

18. The system as in claim 11 wherein the indication of the timeout period comprises an amount of time after which the first randomly-generated code becomes invalid.

19. The system as in claim 18 wherein the indication of the timeout period includes a timestamp associated with the transmission of the first randomly-generated code from the server to the client.

20. The system as in claim 11 wherein the indication of the timeout period comprises a specific time.

21. A non-transitory machine-readable medium having program code stored thereon which, when executed by a machine, causes the machine to perform the operations of:

generating a first random challenge comprising a first randomly-generated code at a server;

transmitting the first random challenge and an indication of a timeout period associated with the first random challenge from the server to a client;

automatically detecting at the client that the first random challenge comprising the first random code is no longer valid based on the timeout period;

responsively transmitting a request for a new random challenge from the client to the server, wherein transmitting is performed without user intervention;

generating a new random challenge comprising a new randomly-generated code at the server responsive to the request for the new random challenge received from the client, and transmitting the new randomly-generated code and an indication of a timeout period associated with the new random challenge to the client;

using the new randomly-generated code when registering one or more authentication devices on the client with the server or a different server and/or when authenticating the user with the server or a different server using the one or more authentication devices, wherein during the operations of registering the authentication devices or authenticating the user, the new randomly-generated code, a signature generated over the new randomly-generated code, and/or an encrypted version of the new randomly-generated code, is transmitted from the client to the server, and validating the new randomly-generated code at the server to confirm the operations of registering the authentication devices and/or authenticating the user.

22. The non-transitory machine-readable medium as in claim 21 wherein the first and new random challenges comprise random numbers or random ID codes generated by the server.

23. The non-transitory machine-readable medium as in claim 22 wherein the first and new randomly-generated codes comprise cryptographic nonces.

24. The non-transitory machine-readable medium as in claim 21 comprising additional program code to cause the machine to perform the operations of:

transmitting the new randomly-generated code from the client to the server to establish a secure connection between the client and the server.

25. The non-transitory machine-readable medium as in claim 21 wherein the encrypted version of the new randomly-generated code is encrypted using a key associated with an authenticator on the client.

26. The non-transitory machine-readable medium as in claim 25 comprising additional program code to cause the machine to perform the operations of:

collecting biometric authentication data from a user using a biometric authentication device on the client;

confirming the identity of the user with the biometric authentication data prior to the new random challenge becoming invalid due to expiration of the time period; and transmitting the new authentication data to the server with the new random challenge.

27. The non-transitory machine-readable medium as in claim 26 wherein the server verifies the identity of the user and decrypts the new randomly-generated code using a key corresponding to the biometric authentication device.

28. The non-transitory machine-readable medium as in claim 21 wherein the indication of the timeout period comprises an amount of time after which the first randomly-generated code becomes invalid.

29. The non-transitory machine-readable medium as in claim 28 wherein the indication of the timeout period includes a timestamp associated with the transmission of the first randomly-generated code from the server to the client.

30. The non-transitory machine-readable medium as in claim 21 wherein the indication of the timeout period comprises a specific time.

31. The method as in claim 1 wherein registering one or more authentication devices on the client with the server comprises:

the client establishing a secure communication connection with the server;

the client transmitting over the secure connection to the server one or more sets of identification data identifying one or more authentication devices on the client to be registered with the server; and the server attesting the one or more devices using the identification data.

32. The method as in claim 31 further comprising:

generating at least one key for each of the one or more authentication devices;

securely storing a key associated with each of the one or more authentication devices in a secure storage on the client; and securely storing a key associated with each of the one or more authentication devices in a secure storage on the server.

33. The method as in claim 32 wherein generating at least one key for each of the one or more authentication devices comprises generating a public/private key pair for each of the one or more authentication devices, wherein the private key of the public/private key pair is stored in the secure storage on the client and the public key of the public/private key pair is stored in the secure storage on the server.

34. The method as in claim 33 wherein authenticating the user with the server or a different server using the one or more authentication devices comprises:

a user of the client attempting to complete a transaction which requires authentication;

the server or a different server identifying at least one of the one or more authentication devices on the client to be used for authentication;

the user performing authentication using the identified one of the one or more authentication devices;

the client encrypting the new randomly-generated code using the private key associated with the identified one of the one or more authentication devices and transmitting the encrypted new randomly-generated code to the server; and the server validating the new randomly-generated code by decrypting the new randomly-generated code using the public key associated with the identified one of the one or more authentication devices.

* * * * *